United States Patent
Kanemasa et al.

(10) Patent No.: US 10,339,203 B2
(45) Date of Patent: Jul. 2, 2019

(54) CORRELATION COEFFICIENT CALCULATION METHOD, COMPUTER-READABLE RECORDING MEDIUM, AND CORRELATION COEFFICIENT CALCULATION DEVICE

(71) Applicant: FUJITSU LIMITED, Kawasaki-shi, Kanagawa (JP)

(72) Inventors: Yasuhiko Kanemasa, Kawasaki (JP); Atsushi Kubota, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 647 days.

(21) Appl. No.: 14/672,942

(22) Filed: Mar. 30, 2015

(65) Prior Publication Data
US 2015/0317283 A1    Nov. 5, 2015

(30) Foreign Application Priority Data
Apr. 30, 2014   (JP) .................. 2014-094069

(51) Int. Cl.
*G06F 17/18*    (2006.01)

(52) U.S. Cl.
CPC ................... *G06F 17/18* (2013.01)

(58) Field of Classification Search
CPC ................ G06F 17/18; H04L 67/10
See application file for complete search history.

(56) References Cited

U.S. PATENT DOCUMENTS

| | | | | |
|---|---|---|---|---|
| 7,788,370 B2 * | 8/2010 | Yugami | ............... | G06F 11/3447 709/223 |
| 8,832,330 B1 * | 9/2014 | Lancaster | ........... | H04L 43/0852 710/18 |
| 9,052,938 B1 * | 6/2015 | Bhide | ................. | G06F 9/45533 |
| 9,129,226 B2 * | 9/2015 | Sengupta | ............... | G06N 20/00 |
| 2007/0057829 A1 * | 3/2007 | Sugita | ................... | F02D 41/266 341/126 |
| 2007/0112715 A1 * | 5/2007 | Chen | ................... | G06F 11/0709 706/46 |

(Continued)

FOREIGN PATENT DOCUMENTS

| | | |
|---|---|---|
| JP | 2002-7659 | 1/2002 |
| JP | 2007-304647 | 11/2007 |

OTHER PUBLICATIONS

Dodge, Y. "The Concise Encyclopedia of Statistics." Springer, ISBN: 978-387-31742-7, pp. 115-119, 407-435 [retrieved on Aug. 29, 2017]. Retrieved from <https://link.springer.com/content/pdf/10.1007%2F978-0-387-32833-1_309.pdf>.*

(Continued)

*Primary Examiner* — Aniss Chad
*Assistant Examiner* — Alfred H B Wechselberger
(74) *Attorney, Agent, or Firm* — Fujitsu Patent Center

(57) ABSTRACT

A performance diagnostic server acquires time series data that indicates the number of executions per time from a multi-tier system and calculates, on the basis of the time series data, a correlation coefficient of processing types that are executed by a server in each tier. The performance diagnostic server calculates, from a correlation coefficient of processing types, a partial correlation coefficient by removing the effect of the trend of the entire multi tiers and updates the correlation coefficient of the processing types on the basis of the calculated partial correlation coefficient.

6 Claims, 30 Drawing Sheets

(56) References Cited

U.S. PATENT DOCUMENTS

| | | | | |
|---|---|---|---|---|
| 2007/0203870 | A1* | 8/2007 | Saito | G06F 17/10 |
| | | | | 706/52 |
| 2008/0004841 | A1* | 1/2008 | Nakamura | G06F 11/008 |
| | | | | 702/186 |
| 2010/0325493 | A1* | 12/2010 | Morimura | G06F 11/0709 |
| | | | | 714/39 |
| 2011/0078102 | A1* | 3/2011 | Yuyitung | G06F 11/3447 |
| | | | | 706/46 |
| 2011/0307602 | A1* | 12/2011 | Kanemasa | G06F 11/3419 |
| | | | | 709/224 |
| 2014/0365829 | A1* | 12/2014 | Higuchi | G06F 11/34 |
| | | | | 714/37 |
| 2015/0032884 | A1* | 1/2015 | Greifeneder | H04L 67/10 |
| | | | | 709/224 |
| 2016/0004620 | A1* | 1/2016 | Ohike | G06F 11/3419 |
| | | | | 702/176 |
| 2016/0306727 | A1* | 10/2016 | Kato | G06F 11/3428 |

OTHER PUBLICATIONS

Magalhaes et al. "Root-cause Analysis of Performance Anomalies in Web-based Applications" Proceedings of the 2011 ACM Symposium on Applied Computing; doi: 10.1145/1982185.1982234 [retrieved on Nov. 14, 2018]. Retrieved from <https://dl.acm.org/citation.cfm?id=1982234> (Year: 2011).*

Traeger et al. "DARC: Dynamic Analysis of Root Causes of Latency Distributions" Proceedings SIGMETRICS '08, pp. 227-288; doi: 10.1145/1384529.1375489 [retrieved on Nov. 14, 2018]. Retrieved from <https://dl.acm.org/citation.cfm?id=1375489> (Year: 2008).*

Atikoglu et al. "Workload Analysis of Large-Scale Key-Value Store" Proceedings SIGMETRICS '12, pp. 53-64; doi: 10.1145/2318857.2254766 [retrieved on Nov. 20, 2018]. Retrieved from <https://dl.acm.org/citation.cfm?id=2254766> (Year: 2012).*

Sakurai et al. "Fast Discovery of Group Lag Correlations in Streams ACM Transactions on Knowledge Discovery from Data", vol. 5 , No. 1, Article 5 [retrieved on Nov. 20, 2018]. Retrieved from <https://dl.acm.org/citation.cfm?id=1870101> (Year: 2010).*

Wang et al. "Learning Causal Relations in Multivariate Time Series Data" ACM Transactions on Intelligent Systems and Technology, vol. 3, No. 4, Article 76 [retrieved on Mar. 28, 2019]. Retrieved from <https://dl.acm.org/citation.cfm?id=2337561> (Year: 2012).*

Yemini et al. "High Speed and Robust Event Correlation" IEEE Communications Magazine, vol. 34, Issue 5, pp. 82-90; doi:10.1109/35.492975 [retrieved on Mar. 28, 2019]. Retrieved from <https://ieeexplore.ieee.org/document/492975> (Year: 1996).*

Agarwala et al. "E2EProf: Automated End-to-End Performance Management for Enterprise Systems" 37th Annual IEEE/IFIP International Conference on Dependable Systems and Networks (DSN'07); doi:10.1109/DSN.2007.38 [retrieved on Mar. 28, 2019]. Retrieved from <https://ieeexplore.ieee.org/document/4273026> (Year: 2007).*

Agarwal et al. "Performance Problem Prediction in Transaction-Based e-Business Systems" IEEE Transactions on Network and Service Management, vol. 5, No. 1 [retrieved on Mar. 28, 2019]. Retrieved from <https://ieeexplore.ieee.org/document/4570775> (Year: 2008).*

* cited by examiner

FIG.3

| TIME | TIER INFORMATION | PROCESSING TYPE ID | NUMBER OF EXECUTIONS |
|---|---|---|---|
| 7:00:01 | WEB TIER | PROCESSING TYPE O | 4 |
| | WEB TIER | PROCESSING TYPE P | 1 |
| | WEB TIER | PROCESSING TYPE Q | 2 |
| | ... | | |
| | AP TIER | PROCESSING TYPE X | 4 |
| | AP TIER | PROCESSING TYPE Y | 4 |
| | AP TIER | PROCESSING TYPE Z | 1 |
| | ... | | |
| | DB TIER | PROCESSING TYPE A | 14 |
| | DB TIER | PROCESSING TYPE B | 14 |
| | DB TIER | PROCESSING TYPE C | 2 |
| | ... | | |
| 7:00:02 | WEB TIER | PROCESSING TYPE O | 5 |
| | WEB TIER | PROCESSING TYPE P | 5 |
| | WEB TIER | PROCESSING TYPE Q | 2 |
| | ... | | |
| | AP TIER | PROCESSING TYPE X | 3 |
| | AP TIER | PROCESSING TYPE Y | 4 |
| | AP TIER | PROCESSING TYPE Z | 2 |
| | ... | | |
| | DB TIER | PROCESSING TYPE A | 3 |
| | DB TIER | PROCESSING TYPE B | 2 |
| | DB TIER | PROCESSING TYPE C | 10 |
| | ... | | |
| ... | | | |

| COMBINATION INFORMATION ON CORRELATION COEFFICIENT | NUMBER OF SAMPLES | CORRELATION COEFFICIENT |
|---|---|---|
| PROCESSING TYPE X, PROCESSING TYPE A | ... | CC (X, A) |
| PROCESSING TYPE X, ENTIRE AP TIER | ... | CC (X, $T_{APP}$) |
| PROCESSING TYPE X, ENTIRE DB TIER | ... | CC (X, $T_{DB}$) |
| PROCESSING TYPE A, ENTIRE AP TIER | ... | CC (A, $T_{APP}$) |
| PROCESSING TYPE A, ENTIRE DB TIER | ... | CC (A, $T_{DB}$) |
| ENTIRE AP TIER, ENTIRE DB TIER | ... | CC ($T_{APP}$, $T_{DB}$) |
| ... | ... | ... |

| COMBINATION INFORMATION ON PARTIAL CORRELATION COEFFICIENT | NUMBER OF SAMPLES | PARTIAL CORRELATION COEFFICIENT |
|---|---|---|
| PROCESSING TYPE X, PROCESSING TYPE A | ... | PCC (X, A-$T_{APP}$, $T_{DB}$) |
| PROCESSING TYPE Y, PROCESSING TYPE A | ... | PCC (Y, A-$T_{APP}$, $T_{DB}$) |
| PROCESSING TYPE Z, PROCESSING TYPE A | ... | PCC (Z, A-$T_{APP}$, $T_{DB}$) |
| ... | ... | ... |

FIG.6

| COMBINATION INFORMATION ON CORRELATION COEFFICIENT | PROCESSING TYPES SIMULTANEOUSLY CALLED |
|---|---|
| PROCESSING TYPE X, PROCESSING TYPE A | PROCESSING TYPE P, PROCESSING TYPE Q, PROCESSING TYPE Y, PROCESSING TYPE Z |
| ... | ... |

| CALL RELATIONSHIP |
|---|
| PROCESSING TYPE X, PROCESSING TYPE A |
| PROCESSING TYPE Y, PROCESSING TYPE B |
| ... |

CORRELATION COEFFICIENT CALCULATION METHOD, COMPUTER-READABLE RECORDING MEDIUM, AND CORRELATION COEFFICIENT CALCULATION DEVICE

CROSS-REFERENCE TO RELATED APPLICATION(S)

This application is based upon and claims the benefit of priority of the prior Japanese Patent Application No. 2014-094069, filed on Apr. 30, 2014, the entire contents of which are incorporated herein by reference.

FIELD

The embodiment discussed herein is related to a correlation coefficient calculation method or the like.

BACKGROUND

In recent years, performance diagnoses related to response delays or the like with respect to multi-tier systems are performed. For example, a multi-tier system is made up of multiple tiers, such as a Web server tier (WEB tier), an application server tier (AP tier), a database server tier (DB tier), or the like. In the multi-tier system, a process is executed in each of the tiers and then a subsequent tier is called, thereby the process is continued. However, even if there is a delay in a response from a processing type in an upper tier, which calls a processing type in a certain lower tier, due to a delay in a response from the processing type in that lower tier because the call relationship among the tiers is uncertain, there may be a case in which this delay is erroneously determined that the response delay is due to a delay in the upper tier.

FIG. 38 is a schematic diagram illustrating an example of transmission of a response delay among tiers. In each of the graphs illustrated in FIG. 38, the vertical axis is the axis associated with the response time and the horizontal axis is the axis associated with the time. Graphs 10a and 10b are graphs that indicate the relationship between the time and the response time of processing types W1 and W2, respectively, running on a Web tier 10. For example, for the processing type W1, a response delay occurs at a time point 11. For the processing type W2, response delays occur at time points 12a and 12b.

Graphs 20a and 20b are graphs that indicate the relationship between the time and the response time of processing types A1 and A2 running on an AP tier 20. For example, for the processing type A1, a response delay occurs at a time point 21. For the processing type A2, a response delay occurs at a time point 22.

Graphs 30a and 30b are graphs that indicate the relationship between the time and the response time of processing types D1 and D2 running on a DB tier 30. For example, for the processing type D1, a response delay occurs at a time point 31.

For example, if a response delay occurs in a certain processing type in the DB tier 30, the response time of the processing type in the upper tier that calls the delayed processing type is increased; therefore, the problem seems to occur in the processing type in the upper tier. For example, in the example illustrated in FIG. 38, if the response delay 31 of the processing type D1 is propagated and thus the response delays occur at the time points 11, 12a, 12b, 21, and 22, the problem seems to occur in the processing types A1 and A2 and the processing types W1 the W2.

If the call relationship between the processing types between the tiers is specified, it is possible to determine whether the response delay is due to the call relationship or due to coincidence and thus it is possible to specify the processing type in which the response delay occurs. Here, there are conventional technologies 1 and 2 that determine the call relationship between processing types.

With the conventional technology 1, regarding two processing types belonging to different tiers, a correlation analysis is performed on two pieces of time series data related to the number of executions. With the conventional technology 1, after the correlation analysis is performed, if it is determined that both "have significant correlation", it is determined that there is the call relationship between these processing types.

FIG. 39 is a schematic diagram illustrating a conventional technology 1. In the example illustrated in FIG. 39, the processing types running on the AP tier 20 are represented by processing types X, Y, and Z. The processing types running on the DB tier 30 are represented by processing types A, B, and C. Pieces of time series data of the processing types X, Y, and Z are represented by time series data 20X, 20Y, and 20Z, respectively. The time series data of the processing type A is represented by time series data 30A. Each piece of the time series data is data that indicates the number of pieces of data executed at each time in the processing types.

With the conventional technology 1, the correlation coefficient of the time series data 30A and the time series data 20X is calculated and, if the calculated correlation coefficient indicates that both have significant correlation, it is determined that the processing type A and the processing type X have the call relationship. With the conventional technology 1, the correlation coefficient of the time series data 30A and the time series data 20Y is calculated and, if the calculated correlation coefficient indicates that both have significant correlation, it is determined that the processing type A and the processing type Y have the call relationship. With the conventional technology 1, the correlation coefficient of the time series data 30A and the time series data 20Z is calculates and, if the calculated correlation coefficient indicates that both have significant correlation, it is determined that the processing type A and the processing type Z have the call relationship.

With the conventional technology 2, correlation coefficients of time series data between a certain processing type in a lower tier and all processing types in an upper tier that can be call candidates for the subject processing types in the lower tier are calculated in a round robin fashion. With the conventional technology 2, on the basis of the value of the subject correlation coefficient, the processing types in the upper tier are divided into a group with a high correlation coefficient and a group with a low correlation coefficient by clustering and then the processing types in the group with the high correlation coefficient are determined as call source processing types.

FIGS. 40 and 41 are schematic diagrams each illustrating a conventional technology 2. In the example illustrated in FIG. 40, the processing types running on the AP tier 20 are represented by processing types X, Y, and Z. Furthermore, other processing types running on the AP tier 20 are not illustrated. The processing type running on the DB tier 30 is represented by the processing type 30A. With the conventional technology 2, correlation coefficients of the time series data between the processing type A and all of the processing types in the AP tier 20 are calculated in a round robin fashion.

With the conventional technology 2, on the basis of the calculation result of the correlation coefficients, clustering is performed on the processing types. FIG. 41 is the graph that indicates the distribution of correlation coefficients; the vertical axis is the axis associated with the number of processing types and the horizontal axis is the axis associated with the correlation coefficients. The conventional technology 2 classifies, in accordance with the magnitude of the correlation coefficients, the results into groups 1A and 1B and determines that the processing types associated with the correlation coefficient in the group 1B is the processing type that has the call relationship with the processing type A. These related-art examples are described, for example, in Japanese Laid-open Patent Publication No. 2002-7659 and Japanese Laid-open Patent Publication No. 2007-304647.

However, with the conventional technologies described above, because the effect due to requests from all of the tiers is not considered, there is a problem in that it is not accurately determine whether there is the call relationship between processing types.

FIG. 42 is a schematic diagram illustrating an example of an effect due to requests from the entire tiers. In FIG. 42, time series data 40a indicates the relationship between the time and the number of executions in the entire multi-tier system. For the processing type that is frequently called, the number of executions thereof is proportional to the number of executions performed in the entire multi-tier system. For example, if it is assumed that a processing type Y and a processing type A are frequently called processing types, time series data 40b on the processing type Y and the time series data 40c on the processing type A are similar to the time series data 40a. Consequently, even if the processing type A is not called by the processing type Y, the correlation coefficient of the processing type A and the processing type Y becomes high and thus it is erroneously determined that the processing type A is called by the processing type Y.

SUMMARY

According to an aspect of an embodiment, a correlation coefficient calculation method includes calculating time series data on the number of requests for processes in tiers in a system that is made up of multiple tiers and time series data on a total number of requests for each tier; calculating a first correlation coefficient of time series data on a first process in a first tier and time series data on a second process in a second tier; calculating a second correlation coefficient of time series data on a total number of requests in the first tier and the time series data on the first process; calculating a third correlation coefficient of time series data on the total number of requests in the first tier and time series data on a total number of requests in the second tier; calculating a fourth correlation coefficient of time series data on the total number of requests in the second tier and the time series data on the second process; calculating a fifth correlation coefficient of the time series data on the total number of requests in the first tier and the time series data on the second process; calculating a sixth correlation coefficient of the time series data on the total number of requests in the second tier and the time series data on the first process; calculating a sixth partial correlation coefficient by removing the effect of all requests in the first tier on the sixth correlation coefficient, using the second correlation coefficient and the third correlation coefficient; calculating a fourth partial correlation coefficient by removing the effect of all requests in the first tier on the fourth correlation coefficient, using the third correlation coefficient and the fifth correlation coefficient; calculating a first partial correlation coefficient by removing the effect of all requests in the first tier on the first correlation coefficient, using the second correlation coefficient and the fifth correlation coefficient; and calculating a correlation coefficient as a correlation coefficient of the first process and the second process, the correlation coefficient being obtained by removing the effect of all requests in the second tier on the first partial correlation coefficient, using the sixth partial correlation coefficient and the fourth partial correlation coefficient.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a schematic diagram illustrating an example of the data structure of first time series data;

FIG. 4 is a schematic diagram illustrating the data structure of a correlation coefficient table;

FIG. 5 is a schematic diagram illustrating an example of the data structure of a first partial correlation coefficient table;

FIG. 6 is a schematic diagram illustrating an example of the data structure of a node list;

FIG. 7 is a schematic diagram illustrating an example of the data structure of call relationship information;

DESCRIPTION OF EMBODIMENTS

Preferred embodiments of the present invention will be explained with reference to accompanying drawings. The present invention is not limited to the embodiment.

Figure 1:
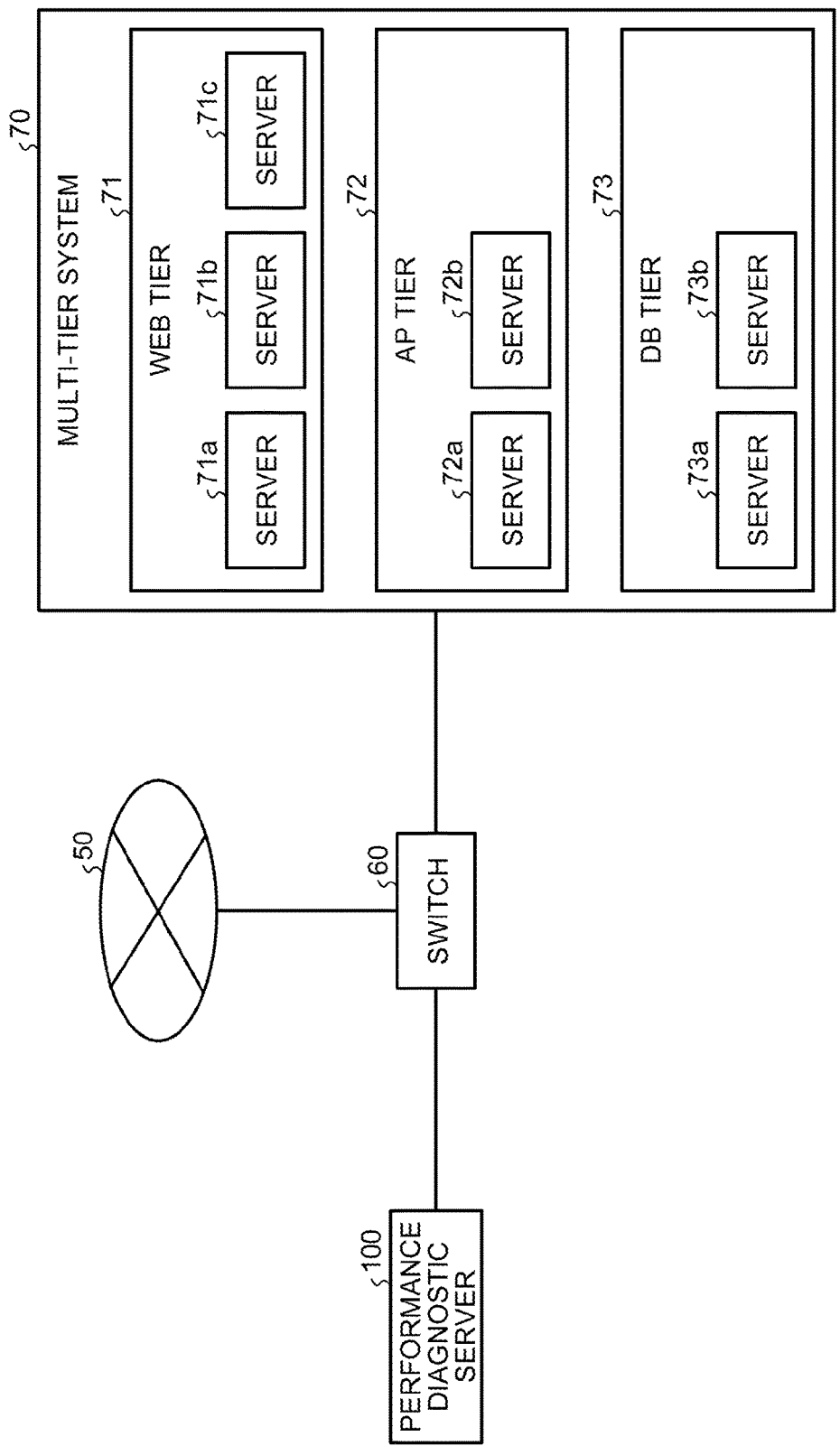
FIG. 1 is a schematic diagram illustrating the configuration of a system according to an embodiment of the present invention.

FIG. 1 is a schematic diagram illustrating the configuration of a system according to an embodiment of the present invention. As illustrated in FIG. 1, this system includes a switch 60, a multi-tier system 70, and a performance diagnostic server 100. The performance diagnostic server 100 is an example of a correlation coefficient calculation device. The multi-tier system 70 and the performance diagnostic server 100 are connected to the switch 60. The switch 60 is connected to a network 50.

The switch 60 is a device that relays data communication between the multi-tier system 70 and the network 50. Furthermore, when the switch 60 receives time series data that indicates the number of executions from the multi-tier system 70, the switch 60 sends the time series data to the performance diagnostic server 100.

The multi-tier system 70 is a system that provides a service by servers in the tiers cooperating with each other. For example, the multi-tier system includes a Web tier 71, an AP tier 72, and a DB tier 73. The Web tier 71 is a tier that includes servers each of which provides a service in accordance with a request from client software, such as a Web browser and that includes servers 71a, 71b, and 71c. The Web tier 71 may also include the other servers.

The AP tier 72 is a tier that includes a server that has a function of concatenating an execution environment of a program or the Web tier 71 to the DB tier 73 and that includes servers 72a and 72b. The AP tier 72 may also include the other servers. The DB tier 73 is a tier that includes a server that sends data requested from the server in the Web tier 71 or the AP tier 72 and that rewrites data in response to an operation request and includes servers 73a and 73b. The DB tier 73 may also include the other servers.

Furthermore, in response to a request from the performance diagnostic server 100, the multi-tier system 70 sends time series data to the performance diagnostic server 100. This time series data is information that indicates, per time, the number of executions of each of the processing types in each tier in the multi-tier system. The time series data will be specifically described later.

Figure 2:
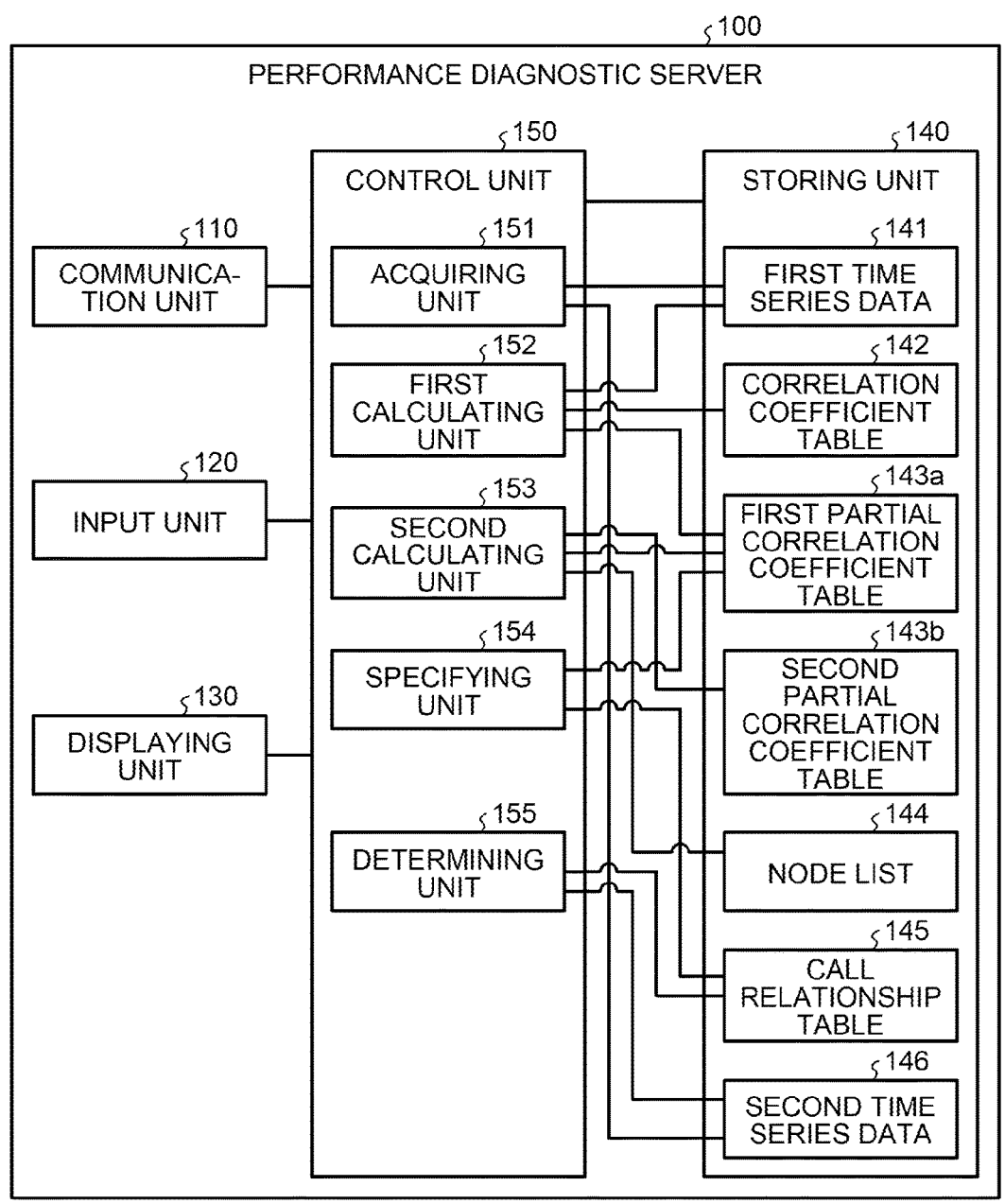
FIG. 2 is a functional block diagram illustrating the configuration of a performance diagnostic server according to the embodiment.

The performance diagnostic server 100 is a server that executes performance diagnosis related to a response delay with respect to the multi-tier system 70. FIG. 2 is a functional block diagram illustrating the configuration of a performance diagnostic server according to the embodiment. As illustrated in FIG. 2, the performance diagnostic server 100 includes a communication unit 110, an input unit 120, a displaying unit 130, a storing unit 140, and a control unit 150.

The communication unit 110 is a processing unit that executes data communication with the other devices via the switch 60 and the network 50. For example, the communication unit 110 corresponds to the communication device. The control unit 150, which will be described later, exchanges data with the other devices via the communication unit 110.

The input unit 120 is an input device that is used to input various kinds of information to the performance diagnostic server 100. For example, the input unit 120 corresponds to a keyboard, a mouse, a touch panel, an input button, or the like. The displaying unit 130 is a display device that displays information output from the control unit 150. The displaying unit 130 corresponds to a liquid crystal display, a touch panel, or the like.

The storing unit 140 includes a first time series data 141, a correlation coefficient table 142, a partial correlation coefficient table 143, a node list 144, a call relationship table 145, and a second time series data 146. The storing unit 140 corresponds to a storage device, such as a semiconductor memory device including, for example, a random access memory (RAM), a read only memory (ROM), a flash memory, or the like.

The first time series data 141 is information that indicates, per time, the number of executions of a processing type that is executed by a server in each tier in the multi-tier system 70. The first time series data 141 is time series data that is used for learning and that is used to create the call relationship table 145.

FIG. 3 is a schematic diagram illustrating an example of the data structure of first time series data. As illustrated in FIG. 3, the first time series data 141 associates the time, the tier information, the processing type ID, and the number of executions with each other. From among these items, the tier information is information that is used to identify a tier in the multi-tier system 7. The processing type ID is information that is used to identify a processing type performed in a server. The number of executions is information that indicates the number of times a subject processing type is executed at subject time. For example, the record in the first line illustrated in FIG. 3 indicates that the "processing type O" in the "Web tier" is executed "four times" at the time "7:00:01".

The correlation coefficient table 142 is a table that holds therein information on a correlation coefficient of processing types. FIG. 4 is a schematic diagram illustrating the data structure of a correlation coefficient table. As illustrated in FIG. 4, the correlation coefficient table 142 stores therein, in an associated manner, combination information on a correlation coefficient, the number of samples, and a correlation coefficient. The combination information on a correlation coefficient is information that indicates the combination of processing types or the like that are used to calculate a correlation coefficient. Furthermore, the entire Web tier indicates all of the processing types executed in the Web tier 71. The entire AP tier indicates all of the processing types executed in the AP tier 72. The entire DB tier indicates all of the processing types executed in the DB tier 73. The record in the first line illustrated in FIG. 4 indicates that the correlation coefficient of the "processing type X" and the "processing type A" is "CC (X, A)". The record in the second line illustrated in FIG. 4 indicates that the correlation coefficient of the "processing type X" and the "entire AP tier" is "CC (X, $T_{APP}$)". The number of samples will be described later.

A first partial correlation coefficient table 143a is a table that holds information on a partial correlation coefficient between processing types. FIG. 5 is a schematic diagram illustrating an example of the data structure of a first partial correlation coefficient table. As illustrated in FIG. 5, the first partial correlation coefficient table 143a stores therein, in an associated manner, combination information on a partial correlation coefficient, the number of samples, and a partial correlation coefficient. The combination information on a partial correlation coefficient is information that indicates the combination of processing types that are used to calculate a partial correlation coefficient. The record in the first line illustrated in FIG. 5 indicates that the partial correlation coefficient of the "processing type X" and the "processing type A" is "PCC (X, A-$T_{APP}$, $T_{DB}$)". The number of samples will be described later.

A second partial correlation coefficient table 143b is a table that holds therein information on a partial correlation coefficient of each combination of the processing types calculated by a second calculating unit 153, which will be described later.

The node list 144 is a table that holds therein information on a candidate for a processing type that is simultaneously called together with a processing type that was used to calculate a correlation coefficient. FIG. 6 is a schematic diagram illustrating an example of the data structure of a node list. As illustrated in FIG. 6, the node list 144 holds therein, in an associated manner, combination information on a correlation coefficient and candidates for processing types that are simultaneously called. The combination information on the correlation coefficient is information that indicates the combination of processing types that are used to calculate a correlation coefficient. Candidates for the processing types that are simultaneously called indicate candidates for processing types that are simultaneously called together with the processing types that were used to calculate a correlation coefficient. For example, in the example illustrated in the first line in FIG. 6, "the processing type P, the processing type Q, the processing type Y, and the processing type Z" are candidates for the processing types that are simultaneously called together with the "processing type X" and the "processing type A".

The call relationship table 145 is a table that holds therein information on the combination of processing types that have the call relationship. FIG. 7 is a schematic diagram illustrating an example of the data structure of call relationship information. The record in the first line illustrated in FIG. 7 indicates that the "processing type X" and the "processing type A" have the call relationship.

The second time series data 146 is information in which a response time of each of the processing types executed by a server in each tier in the multi-tier system 70 is associated with the time. The response time is the time period from when a server receives a request for a service until when the server provides the service.

The control unit 150 includes an acquiring unit 151, a first calculating unit 152, the second calculating unit 153, a specifying unit 154, and a determining unit 155. The control unit 150 corresponds to, for example, an integrated circuit, such as an application specific integrated circuit (ASIC), a field programmable gate array (FPGA), or the like. Furthermore, the control unit 150 corresponds to an electronic circuit, such as a central processing unit (CPU), a micro processing unit (MPU), or the like.

The acquiring unit 151 is a processing unit that acquires time series data from the multi-tier system 70. The acquiring unit 151 stores the acquired time series data in the storing unit 140 as the first time series data 141. Furthermore, when the acquiring unit 151 acquires data that indicates the relationship between the response time and the time from the multi-tier system 70, the acquiring unit 151 stores the acquired data in the storing unit 140 as the second time series data 146.

The first calculating unit 152 is a processing unit that calculates a correlation coefficient of processing types on the basis of the first time series data 141. Furthermore, by removing the effect of the trend of the entire multi tiers from each of the correlation coefficients of the processing types, the first calculating unit 152 updates each of the correlation coefficients of the processing types. The first calculating unit 152 registers, in the correlation coefficient table 142, the information on the calculated correlation coefficients of the processing types.

A process performed by the first calculating unit 152 will be specifically described. First, the first calculating unit 152 creates, on the basis of the first time series data 141, time series data that indicates the relationship between the number of executions of each processing type and the time. The first calculating unit 152 creates time series data that indicates the relationship between the number of executions of all of the processing types included in the Web tier 71 and the time. The first calculating unit 152 creates time series data that indicates the relationship between the number of executions of all of the processing types included in the AP tier 72 and the time. The first calculating unit 152 creates time series data that indicates the relationship between the number of executions of all of the processing types included in the DB tier 73 and the time.

Subsequently, after creating each piece of the time series data, the first calculating unit 152 calculates a correlation coefficient of processing types. For example, the correlation coefficient of the time series data on the processing type X and the time series data on the processing type A is represented by CC (X, A).

The first calculating unit 152 calculates a correlation coefficient of the time series data on the entire Web tier 71 and each of the pieces of the time series data on the processing types. For example, the correlation coefficient of the time series data on the entire Web tier 71 and the time series data on the processing type X is represented by CC (X, $T_{Web}$).

The first calculating unit 152 calculates a correlation coefficient of the time series data on the entire AP tier 72 and each of the pieces of the time series data on the processing types. For example, the correlation coefficient of the time series data in the entire AP tier 72 and the time series data on the processing type X is represented by CC (X, $T_{APP}$).

The first calculating unit 152 calculates a correlation coefficient of the time series data on the entire DB tier 73 and each of the pieces of the time series data on the processing types. For example, the correlation coefficient of the time series data on the entire DB tier 73 and the time series data on the processing type X is represented by CC (X, $T_{DB}$).

Furthermore, the first calculating unit 152 calculates the correlation coefficient CC ($T_{Web}$, $T_{APP}$) of the time series data on the entire Web tier 71 and the time series data on the entire AP tier 72. The first calculating unit 152 calculates the correlation coefficient CC ($T_{APP}$, $T_{DB}$) of the time series data on the entire AP tier 72 and the time series data on the entire DB tier 73. The first calculating unit 152 registers the calculation results of the correlation coefficients in the correlation coefficient table 142.

Figure 8:
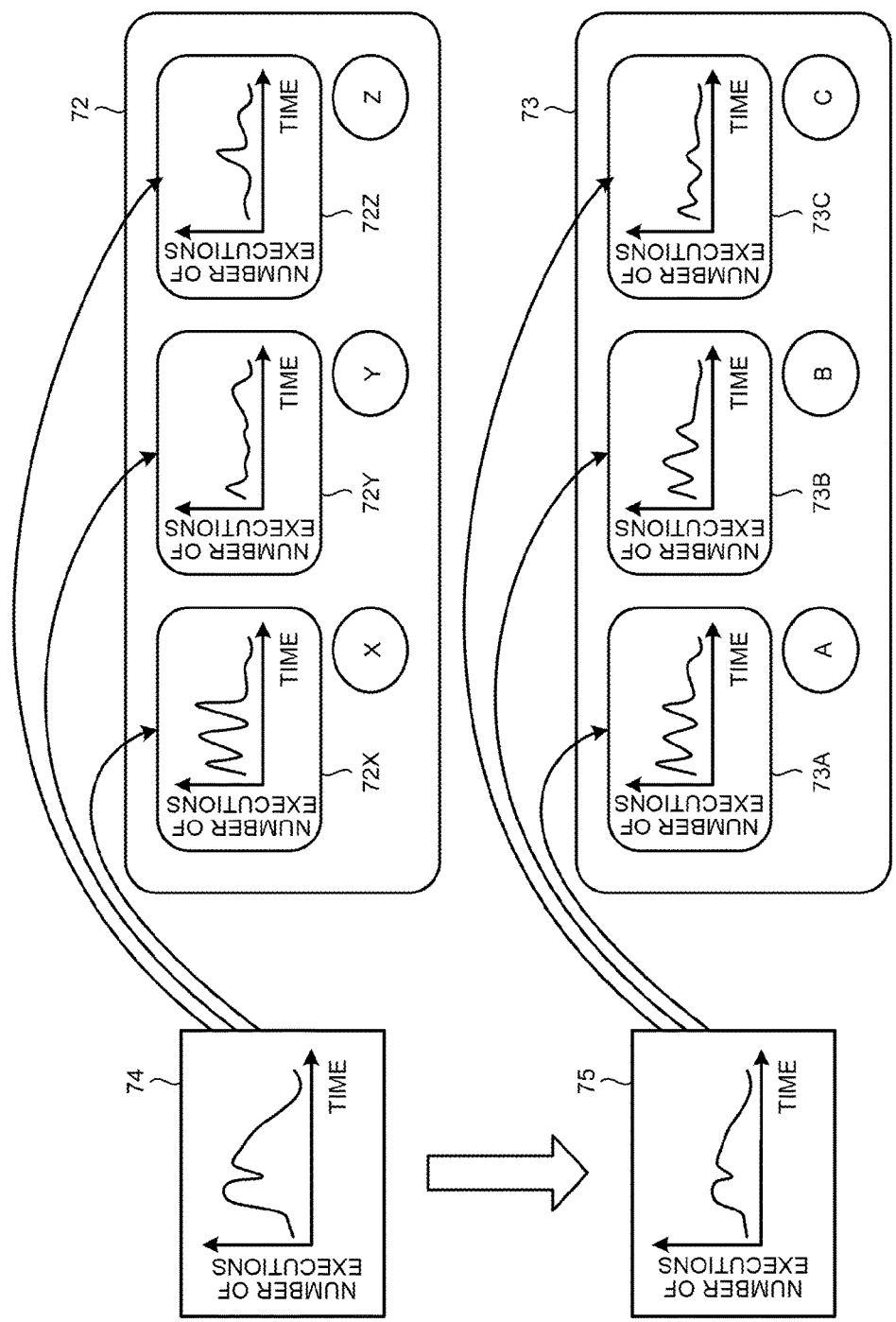
FIG. 8 is a schematic diagram illustrating an effect of the trend of the entire multi tiers.

Then, after calculating each of the correlation coefficients, the first calculating unit 152 executes a process of removing an effect of the trend of the entire multi tiers from each of the correlation coefficients of the processing types. FIG. 8 is a schematic diagram illustrating an effect of the trend of the entire multi tiers. In FIG. 8, the AP tier 72 and the DB tier 73 will be described as an example.

As illustrated in FIG. 8, the trend of a time series data 74 on the entire AP tier affects time series data 72X on the processing type X, time series data 72Y on the processing type Y, and time series data 72Z on the processing type Z. The trend of the time series data 74 on the entire AP tier affects time series data 75 on the entire DB tier. The trend of the time series data 75 on the entire DB tier affects time series data 73A on the processing type A, time series data 73B on the processing type B, and time series data 73C on the processing type C.

FIGS. 9 to 12 are schematic diagrams each illustrating an example of a process of removing an effect of the trend of the entire multi tiers. In the examples illustrated in FIGS. 9 to 12, a description will be given of an example of calculating the partial correlation coefficient PCC (X, A-$T_{APP}$, $T_{DB}$) that is obtained by removing the trend of the entire multi tiers from the correlation coefficient of the processing type X and the processing type A. Here, as an example of the trend of the entire multi tiers, the trend of the time series data 74 on the entire AP tier 72 and the trend of the time series data 75 on the entire DB tier 73 are indicated.

Figure 9:
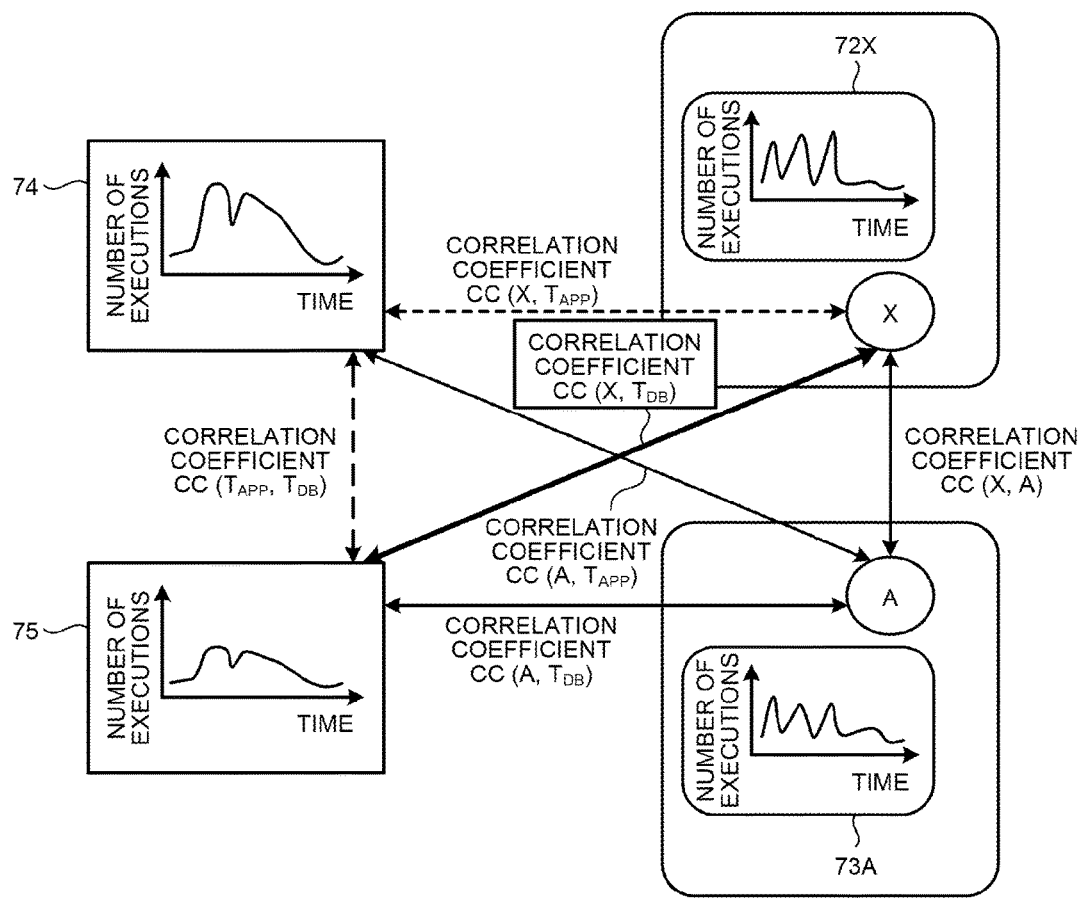
FIG. 9 is a schematic diagram (No. 1) illustrating an example of a process of removing the effect of the trend of the entire multi tiers.

The example illustrated in FIG. 9 will be described. The correlation coefficient of the time series data 74 on the entire AP tier 72 and the time series data 75 on the entire DB tier 73 is represented by the correlation coefficient CC ($T_{APP}$, $T_{DB}$). The correlation coefficient of the time series data 74 on the entire AP tier 72 and the time series data 72X on the processing type X is represented by the correlation coefficient CC (X, $T_{APP}$). The correlation coefficient of the time series data 74 on the entire AP tier 72 and the time series data 73A on the processing type A is represented by the correlation coefficient CC (A, $T_{APP}$). The correlation coefficient of the time series data 75 on the entire DB tier 73 and the time series data 72X on the processing type X is represented by the correlation coefficient CC (X, $T_{DB}$). The correlation coefficient of the time series data 75 on the entire DB tier 73 and the time series data 73A on the processing type A is represented by the correlation coefficient CC (A, $T_{DB}$). The correlation coefficient of the time series data 72X on the processing type X and the time series data 73A on the processing type A is represented by the correlation coefficient CC (X, A).

The first calculating unit 152 executes the following process and removes, one by one, an effect of the time series data 74 on the entire AP tier 72 on the other correlation coefficients. In FIG. 9, the first calculating unit 152 calculates the partial correlation coefficient PCC (X, $T_{DB}$-$T_{APP}$) by removing the effect of the time series data 74 on the entire AP tier 72 from the correlation coefficient CC (X, $T_{DB}$). For example, the first calculating unit 152 calculates the partial correlation coefficient PCC (X, $T_{DB}$-$T_{APP}$) on the basis of Equation (1).

$$\text{Partial Correlation Coefficient } PCC(X, T_{DB} - T_{APP}) = \frac{CC(X, T_{DB}) - CC(X, T_{APP}) \times CC(T_{APP}, T_{DB})}{\sqrt{1 - CC(X, T_{APP})^2} \sqrt{1 - CC(T_{APP}, T_{DB})^2}} \quad (1)$$

Figure 10:
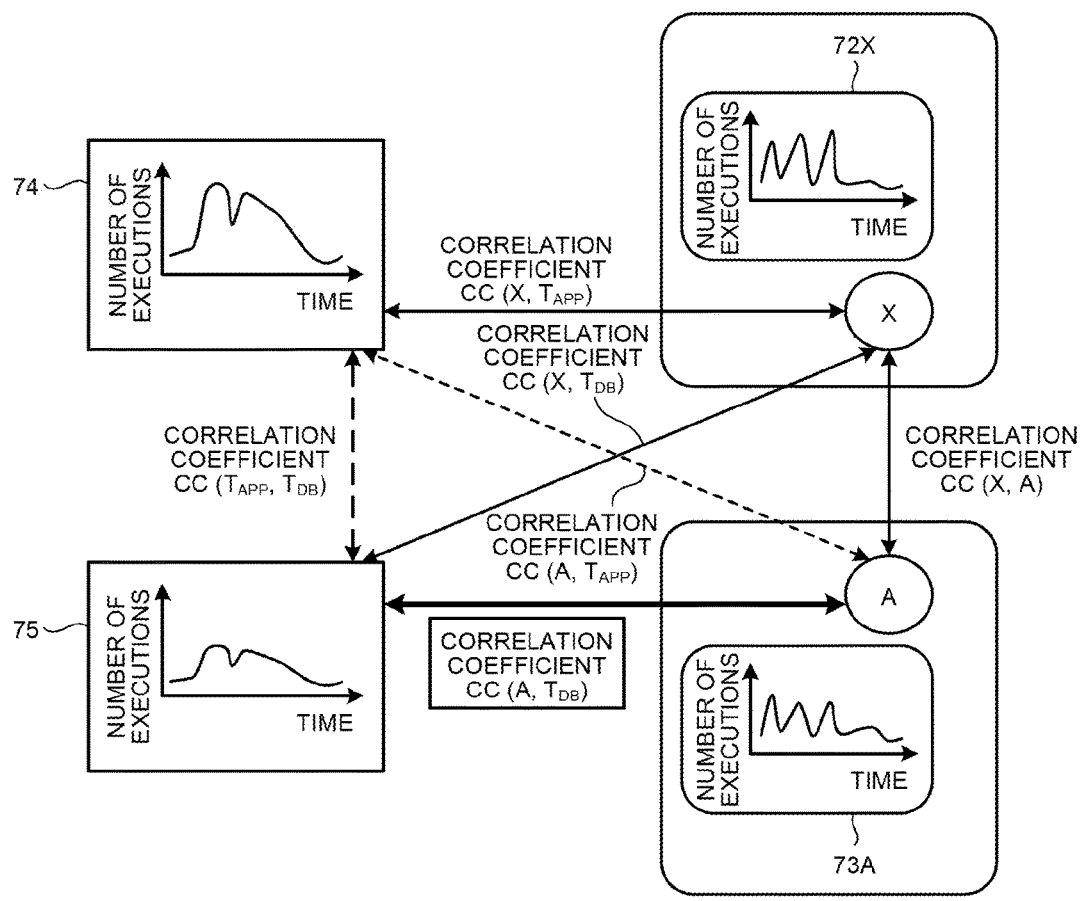
FIG. 10 is a schematic diagram (No. 2) illustrating an example of a process of removing the effect of the trend of the entire multi tiers.

In the following, the example illustrated in FIG. 10 will be described. The first calculating unit 152 calculates the partial correlation coefficient PCC (A, $T_{DB}$-$T_{APP}$) by removing the effect of the time series data 74 on the entire AP tier 72 from the correlation coefficient CC (A, $T_{DB}$). For example, the first calculating unit 152 calculates the partial correlation coefficient PCC (A, $T_{DB}$-$T_{APP}$) on the basis of Equation (2).

$$\text{Partial Correlation Coefficient } PCC(A, T_{DB} - T_{APP}) = \frac{CC(A, T_{DB}) - CC(A, T_{APP}) \times CC(T_{APP}, T_{DB})}{\sqrt{1 - CC(A, T_{APP})^2} \sqrt{1 - CC(T_{APP}, T_{DB})^2}} \quad (2)$$

Figure 11:
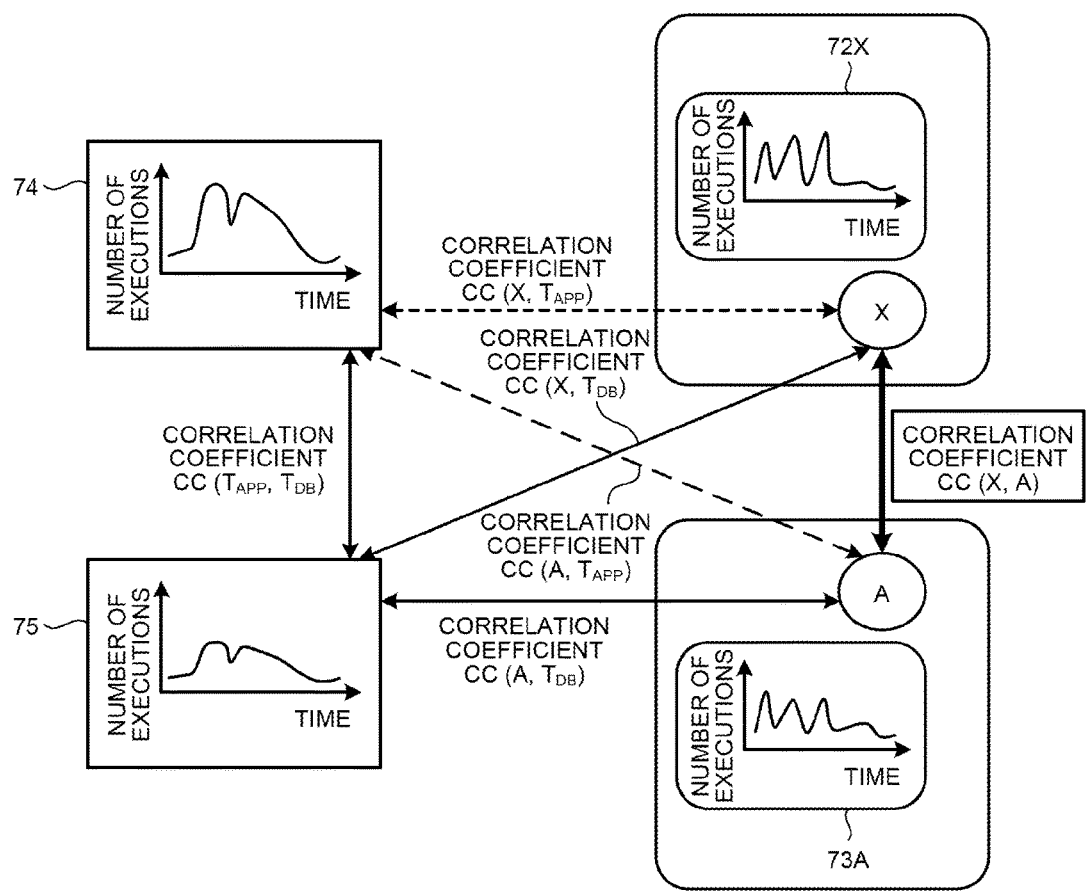
FIG. 11 is a schematic diagram (No. 3) illustrating an example of a process of removing the effect of the trend of the entire multi tiers.

In the following, the example illustrated in FIG. 11 will be described. The first calculating unit 152 calculates the partial correlation coefficient PCC (X, A-$T_{APP}$) by removing the effect of the time series data 74 on the entire AP tier 72 from the correlation coefficient CC (X, A). For example, the first calculating unit 152 calculates the partial correlation coefficient PCC (X, A-$T_{APP}$) on the basis of Equation (3). By executing the processes illustrated in FIGS. 9 to 11, the first calculating unit 152 can remove the effect of the time series data 74 on the entire AP tier 72 from the correlation coefficients CC (X, $T_{DB}$), CC (A, $T_{DB}$), and CC (X, A).

$$\text{Partial Correlation Coefficient } PCC(X, A - T_{APP}) = \quad (3)$$
$$\frac{CC(X, A) - CC(X, T_{APP}) \times CC(A, T_{APP})}{\sqrt{1 - CC(X, T_{APP})^2} \sqrt{1 - CC(A, T_{APP})^2}}$$

Figure 12:
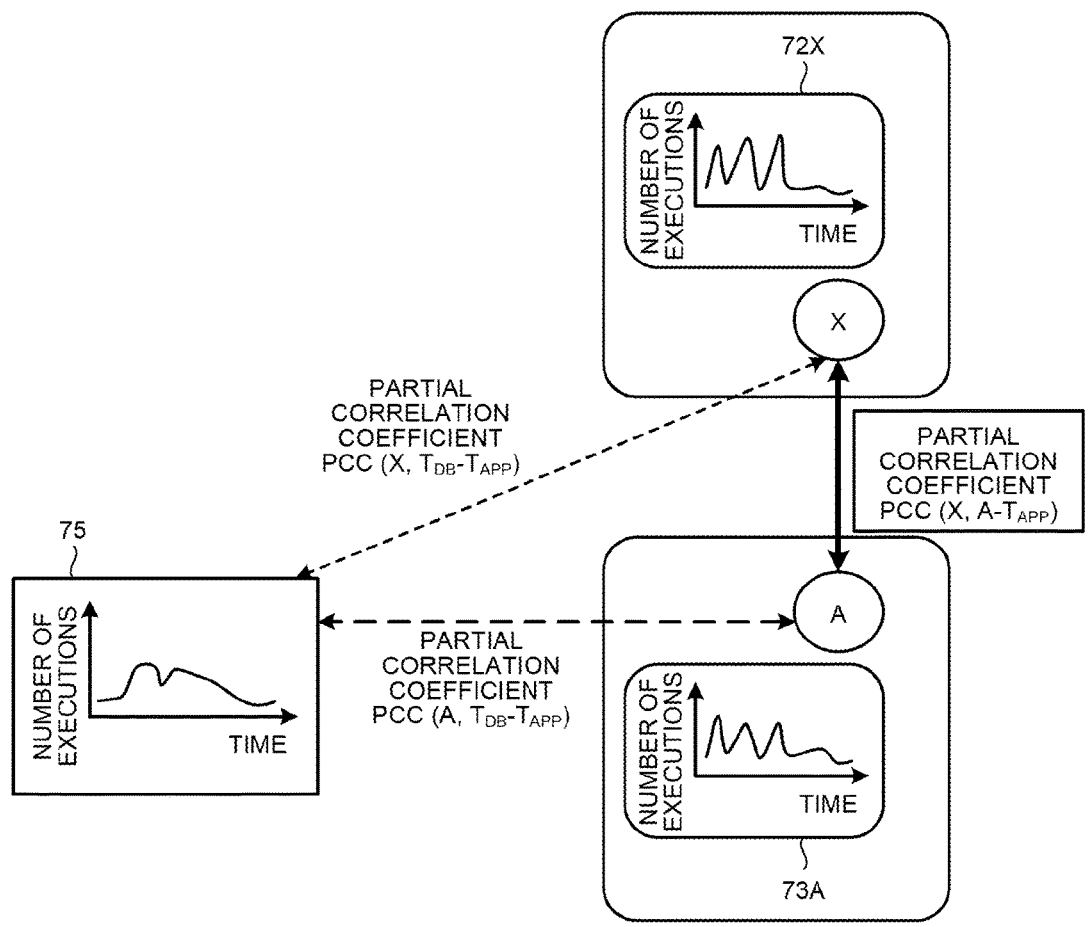
FIG. 12 is a schematic diagram (No. 4) illustrating an example of a process of removing the effect of the trend of the entire multi tiers.

In the following, the example illustrated in FIG. 12 will be described. The first calculating unit 152 removes the effect of the time series data 75 on the entire DB tier 73 on the correlation coefficient of the processing type X and the processing type A. Specifically, the first calculating unit 152 calculates, on the basis of Equation (4), the partial correlation coefficient PCC (X, A-$T_{APP}$, $T_{DB}$) obtained by removing the effect of the time series data 75 related to the entire DB tier 73 on the correlation coefficient (partial correlation coefficient PCC (X, A-$T_{APP}$)) of the processing type X and the processing type A.

$$\text{Partial Correlation Coefficient } PCC(X, A - T_{APP}, T_{DB}) = \quad (4)$$
$$\frac{PCC(X, A - T_{APP}) - PCC(X, T_{DB} - T_{APP}) \times PCC(A, T_{DB} - T_{APP})}{\sqrt{1 - PCC(X, T_{DB} - T_{APP})^2} \sqrt{1 - PCC(A, T_{DB} - T_{APP})^2}}$$

By repeatedly executing the same process as that described above on the other correlation coefficients of processing types, the first calculating unit 152 also calculates a partial correlation coefficient that is obtained by removing the effect of the trend of the entire multi tiers from each of the correlation coefficients of processing types. The first calculating unit 152 registers the calculation results of the partial correlation coefficients in the first partial correlation coefficient table 143a.

Figure 13:
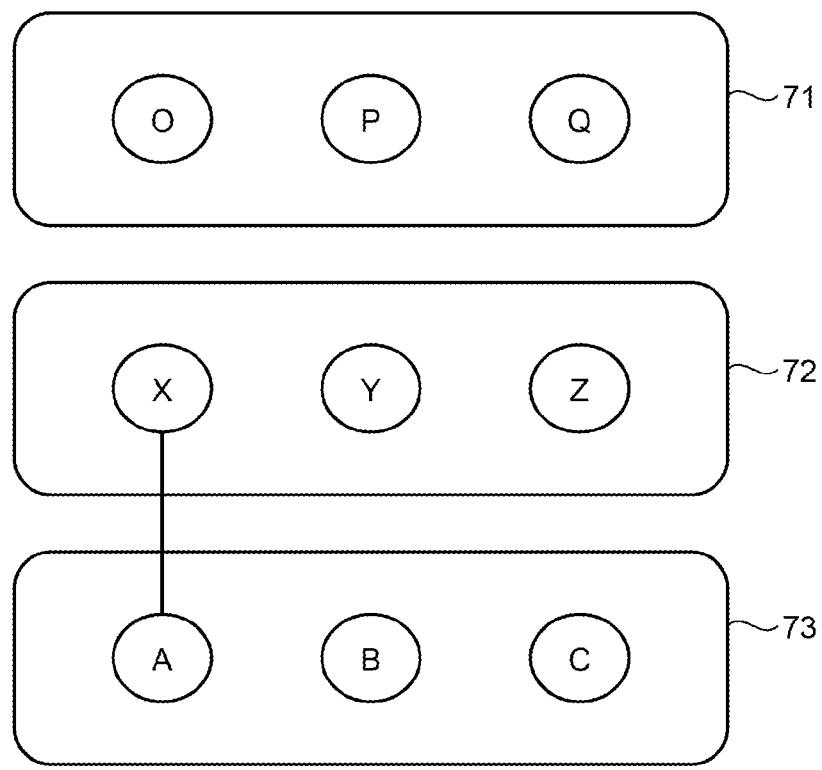
FIG. 13 is a schematic diagram (No. 1) illustrating an example of a process of removing the effect of simultaneous calls.

A description will be given here by referring back to FIG. 2. The second calculating unit 153 is a processing unit that removes the effect due to a simultaneous call from a correlation coefficient (a partial correlation coefficient) of processing types. FIGS. 13 to 29 are schematic diagrams each illustrating an example of a process of removing the effect of a simultaneous call. As illustrated in FIG. 13, a description will be given of a case in which, as an example, an effect of a simultaneous call is removed from the correlation coefficient of the processing type X and the processing type A. It is assumed that the processing type O, the processing type P, and the processing type Q are present in the Web tier 71. It is assumed that the processing type X, the processing type Y, and the processing type Z are present in the AP tier 72. It is assumed that the processing type A, the processing type B, and the processing type C are present in the DB tier 73.

In the following, the example illustrated in FIG. 14 will be described. The second calculating unit 153 specifies, as candidates for processing types that are simultaneously called together with the processing type X, all of the processing types O, P, Q, Y, and Z that are in the tier higher than the processing type X. The second calculating unit 153 refers to the first partial correlation coefficient table 143a and specifies, from among the candidates for the simultaneously called processing types, a processing type that has significant correlation with the processing types X and A at the level of significance α1. The second calculating unit 153 deletes the processing type that does not have significant correlation with the processing types X and A at the level of significance α1 from the candidates for the simultaneously called processing types. The second calculating unit 153 registers, in the node list 144, both a combination of processing types and a processing type that is simultaneously called together with the combination of the processing types. For example, it is assumed that the value of the level of significance α1 is 0.10. The second calculating unit 153 may also correct as needed in accordance with the number of samples of the first time series data 141.

Figure 14:
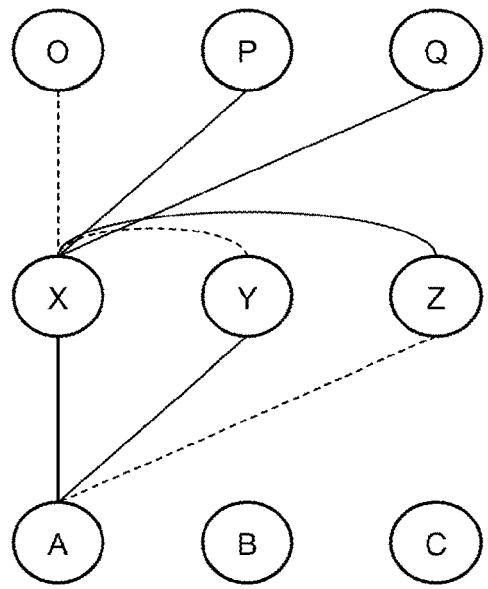
FIG. 14 is a schematic diagram (No. 2) illustrating an example of a process of removing the effect of simultaneous calls.

In FIG. 14, for example, it is assumed that the partial correlation coefficient of the processing type X and the processing types P, Q, and Z indicates that they have significant correlation at the level of significance α1. Furthermore, it is assumed that partial correlation coefficient of the processing type A and the processing type Y indicates that they have significant correlation at the level of significance α1. Here, from among the processing types O, P, Q, Y, and Z that are the candidates for a simultaneous call, the partial correlation coefficient of the processing type O and the processing types X and A indicates that the processing type O does not have significant correlation with the processing types X and A at the level of significance α1. Consequently, the second calculating unit 153 deletes the processing type O from the candidates for the processing types that are simultaneously called. The second calculating unit 153 associates the combination of the processing types X and A with the processing types P, Q, Y, and Z that are candidates for a simultaneous call and then registers them in the node list 144. For the other combinations of the processing types, the second calculating unit 153 also specifies processing type candidates that are simultaneously called and then registers the candidates in the node list 144.

Figure 15:
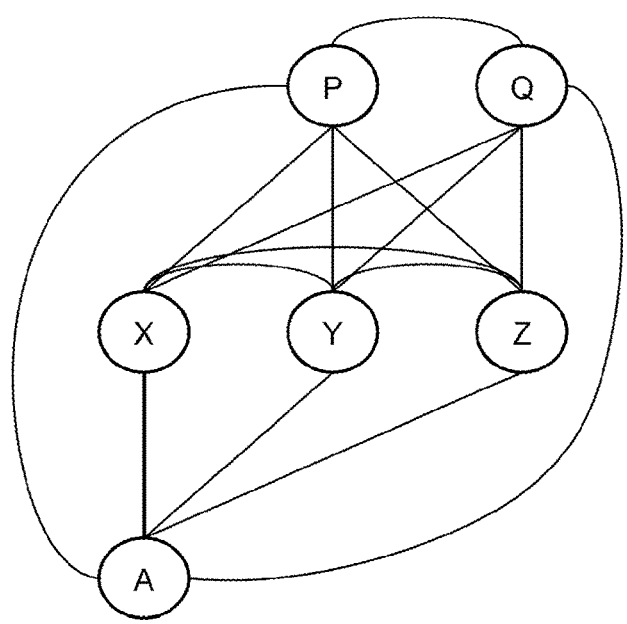
FIG. 15 is a schematic diagram (No. 3) illustrating an example of a process of removing the effect of simultaneous calls.

In the following, the example illustrated in FIG. 15 will be described. The second calculating unit 153 combines the remaining processing types. Namely, the second calculating unit 153 combines the processing type A with the processing types P, Q, Y, and Z. The second calculating unit 153 combines the processing type X with the processing types P, Q, Y, and Z. The second calculating unit 153 combines the processing type Y with the processing types A, X, Z, P, and Q. The second calculating unit 153 combines the processing type Z with the processing types A, X, Y, P, and Q. The second calculating unit 153 combines the processing type P with the processing types A, X, Y, Z, and Q. The second calculating unit 153 combines the processing type Q with the processing types A, X, Y, Z, and P. The initial value of each link corresponds to a partial correlation coefficient of both ends of a processing type of a link.

Figure 16:
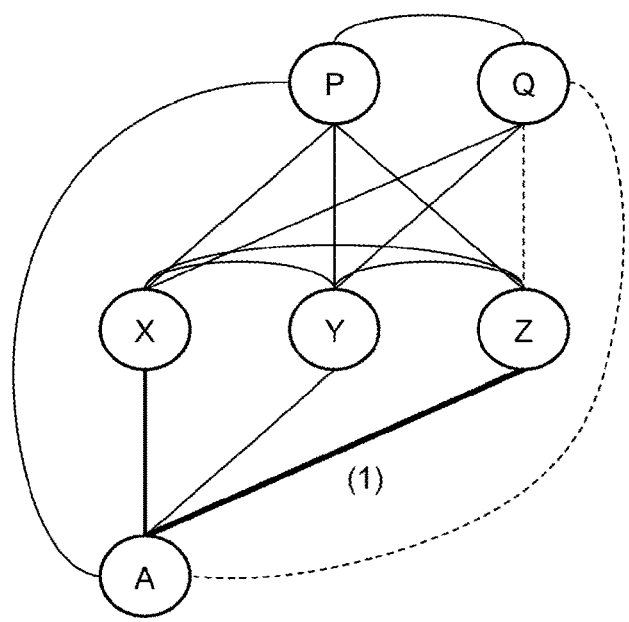
FIG. 16 is a schematic diagram (No. 4) illustrating an example of a process of removing the effect of simultaneous calls.

In the following, the example illustrated in FIG. 16 will be described. The second calculating unit 153 removes, one by one, the processing types P, Q, Y, and Z. Before removing a processing type, the second calculating unit 153 updates the effect of the processing type to be removed to the partial correlation coefficient of the processing types that are combined by a link. Here, a description will be given of a case in which the processing type Q is removed. When removing the processing type Q, the second calculating unit 153 updates the partial correlation coefficient of the processing types Z and A (1) on the basis of the partial correlation coefficient of the processing types Z and A (1), the partial correlation coefficient of the processing types Q and Z, and the partial correlation coefficient of the processing types Q and A. For example, the second calculating unit 153 calculates the partial correlation coefficient of the processing types A and Z (1) on the basis of Equation (5) and then updates the partial correlation coefficient of the processing types A and Z. Equation (5) corresponds to an equation that is used to calculate a general partial correlation coefficient. The equation that is used here to calculate a partial correlation coefficient is an equation for calculating a general partial correlation coefficient; therefore, in a description below, a description of a specific equation will be omitted.

$$\text{Partial Correlation Coefficient } PCC(Z, A - Q) = \frac{CC(Z, A) - CC(Z, Q) \times CC(A, Q)}{\sqrt{1 - CC(Z, Q)^2} \sqrt{1 - CC(A, Q)^2}} \quad (5)$$

Figure 17:
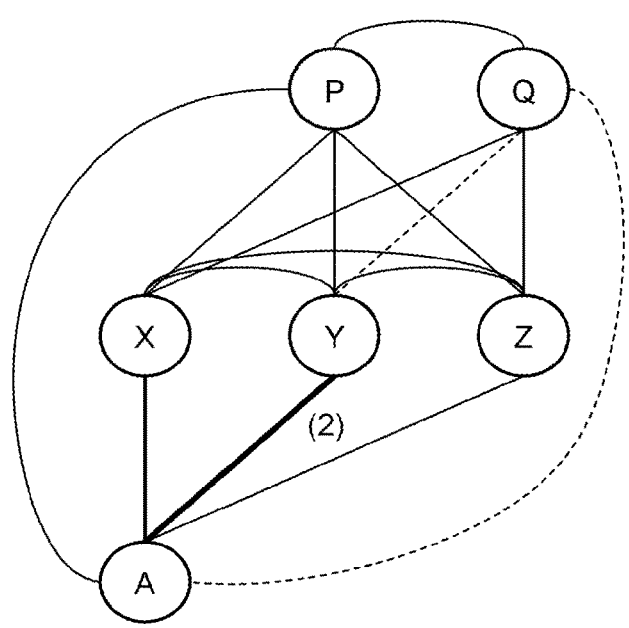
FIG. 17 is a schematic diagram (No. 5) illustrating an example of a process of removing the effect of simultaneous calls.

In the following, the example illustrated in FIG. 17 will be described. When the second calculating unit 153 removes the processing type Q, the second calculating unit 153 updates the partial correlation coefficient of the processing types Y and A (2) on the basis of the partial correlation coefficient of the processing types Y and A (2), the partial correlation coefficient of the processing types Q and Y, and the partial correlation coefficient of the processing types Q and A.

Figure 18:
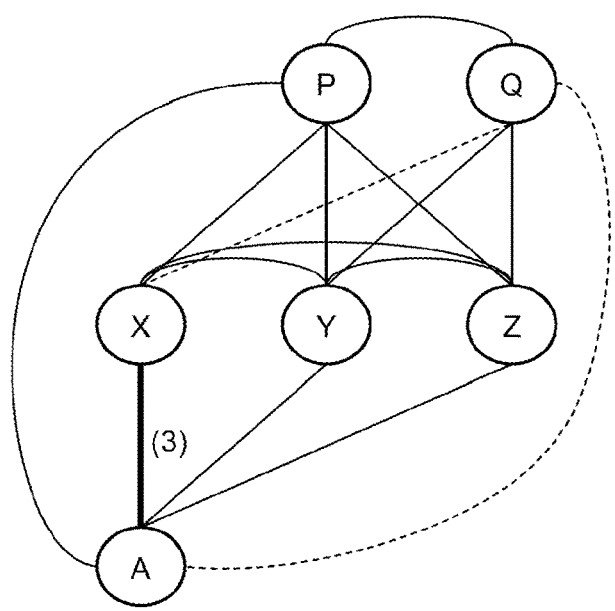
FIG. 18 is a schematic diagram (No. 6) illustrating an example of a process of removing the effect of simultaneous calls.

In the following, the example illustrated in FIG. 18 will be described. When the second calculating unit 153 removes the processing type Q, the second calculating unit 153 updates the partial correlation coefficient of the processing types X and A (3) on the basis of the partial correlation coefficient of the processing types X and A (3), the partial correlation coefficient of the processing types Q and X, and the partial correlation coefficient of the processing types Q and A.

Figure 19:
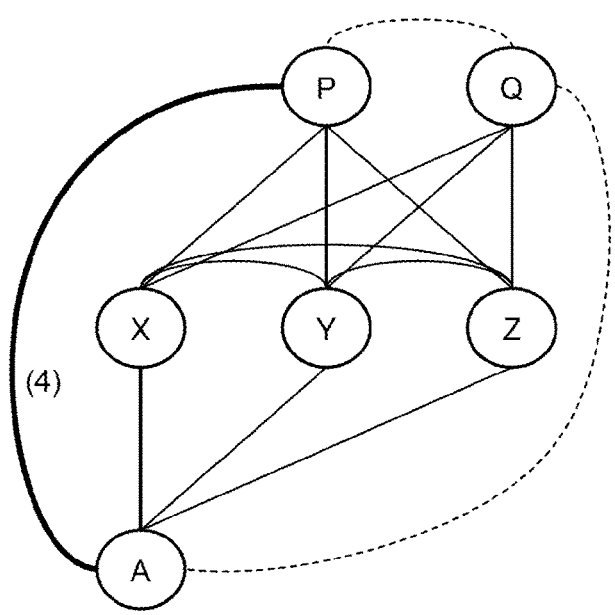
FIG. 19 is a schematic diagram (No. 7) illustrating an example of a process of removing the effect of simultaneous calls.

In the following, the example illustrated in FIG. 19 will be described. When the second calculating unit 153 removes the processing type Q, the second calculating unit 153 updates the partial correlation coefficient of the processing types P and A (4) on the basis of the partial correlation coefficient of the processing types P and A(4), the partial correlation coefficient of the processing types Q and P, and the partial correlation coefficient of the processing types Q and A.

Figure 20:
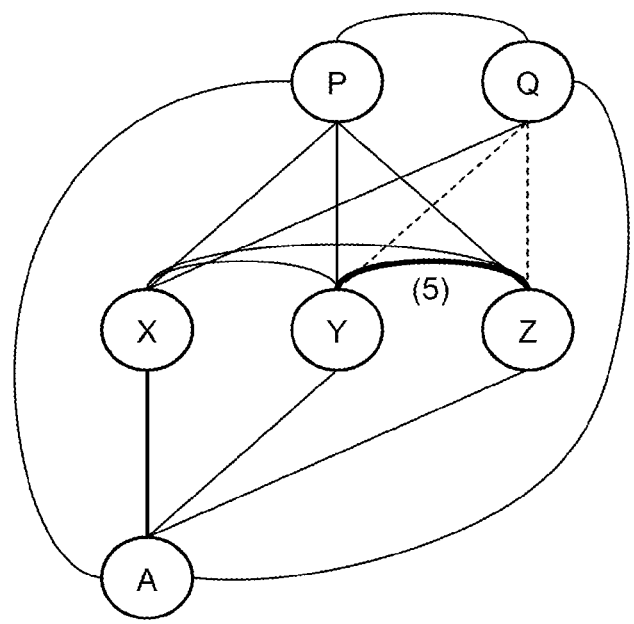
FIG. 20 is a schematic diagram (No. 8) illustrating an example of a process of removing the effect of simultaneous calls.

In the following, the example illustrated in FIG. 20 will be described. When the second calculating unit 153 removes the processing type Q, the second calculating unit 153 updates the partial correlation coefficient of the processing types Y and Z (5) on the basis of the partial correlation coefficient of the processing types Y and Z, the partial correlation coefficient of the processing types Q and Y, and the partial correlation coefficient of the processing types Q and Z.

Figure 21:
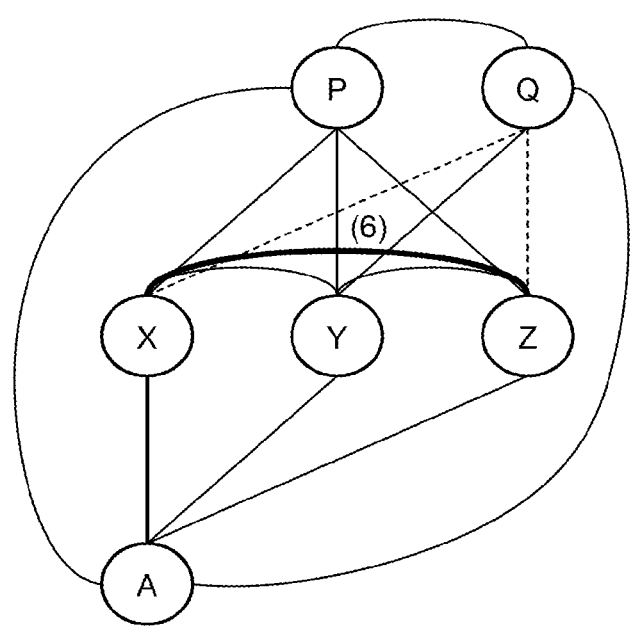
FIG. 21 is a schematic diagram (No. 9) illustrating an example of a process of removing the effect of simultaneous calls.

In the following, the example illustrated in FIG. 21 will be described. When the second calculating unit 153 removes the processing type Q, the second calculating unit 153 updates the partial correlation coefficient of the processing types X and Z (6) on the basis of the partial correlation coefficient of the processing types X and Z (6), the partial correlation coefficient of the processing types Q and X, and the partial correlation coefficient of the processing types Q and Z.

Figure 22:
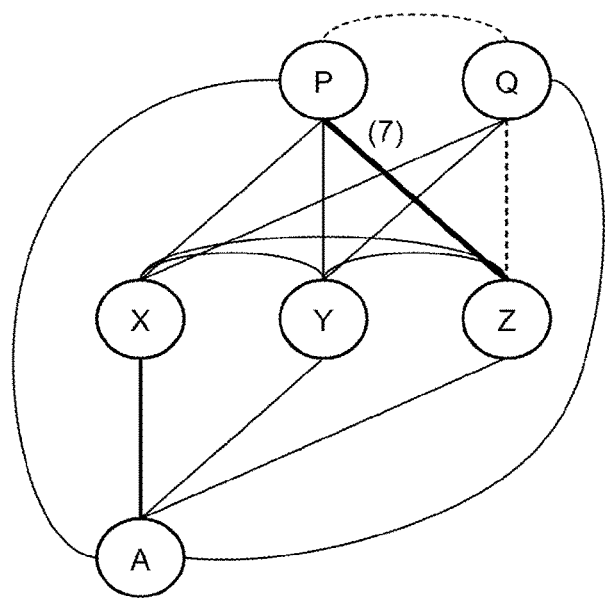
FIG. 22 is a schematic diagram (No. 10) illustrating an example of a process of removing the effect of simultaneous calls.

In the following, the example illustrated in FIG. 22 will be described. When the second calculating unit 153 removes the processing type Q, the second calculating unit 153 updates the partial correlation coefficient of the processing types P and Z (7) on the basis of the partial correlation coefficient of the processing types P and Z (7), the partial correlation coefficient of the processing types Q and P, and the partial correlation coefficient of the processing types Q and Z.

Figure 23:
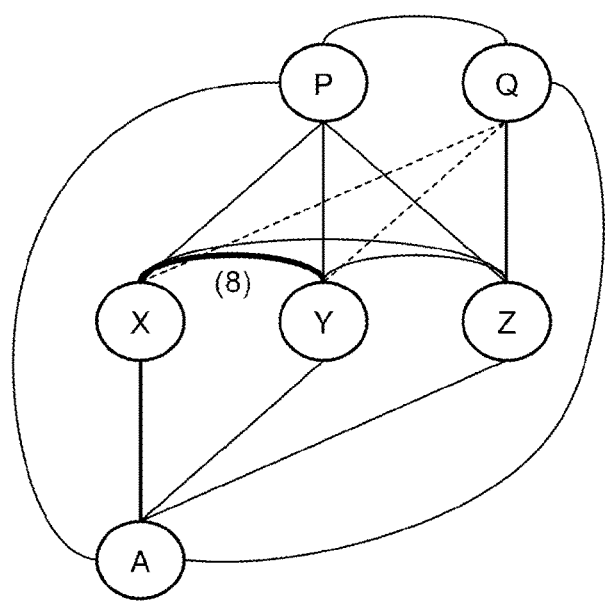
FIG. 23 is a schematic diagram (No. 11) illustrating an example of a process of removing the effect of simultaneous calls.

In the following, the example illustrated in FIG. 23 will be described. When the second calculating unit 153 removes the processing type Q, the second calculating unit 153 updates the partial correlation coefficient of the processing types X and Y (8) on the basis of the partial correlation coefficient of the processing types X and Y (8), the partial correlation coefficient of the processing types Q and X, and the partial correlation coefficient of the processing types Q and Y.

Figure 24:
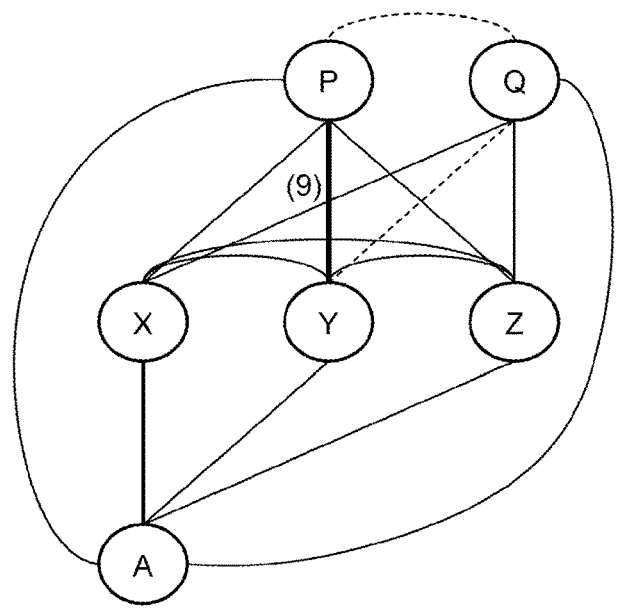
FIG. 24 is a schematic diagram (No. 12) illustrating an example of a process of removing the effect of simultaneous calls.

In the following, the example illustrated in FIG. 24 will be described. When the second calculating unit 153 removes the processing type Q, the second calculating unit 153 updates the partial correlation coefficient of the processing types P and Y (9) on the basis of the partial correlation coefficient of the processing types P and Y (9), the partial correlation coefficient of the processing types Q and P, and the partial correlation coefficient of the processing types Q and Y.

Figure 25:
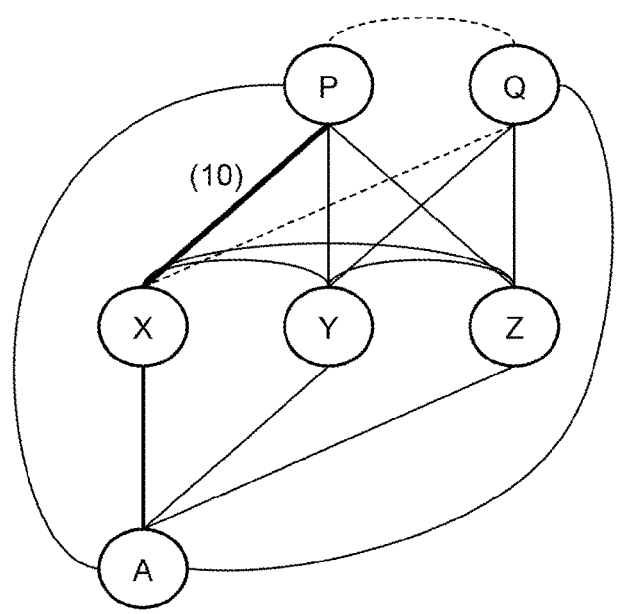
FIG. 25 is a schematic diagram (No. 13) illustrating an example of a process of removing the effect of simultaneous calls.

In the following, the example illustrated in FIG. 25 will be described. When the second calculating unit 153 removes the processing type Q, the second calculating unit 153 updates the partial correlation coefficient of the processing types P and X (10), on the basis of the partial correlation coefficient of the processing types P and X (10), the partial correlation coefficient of the processing types Q and P, and the partial correlation coefficient of the processing types Q and X.

Figure 26:
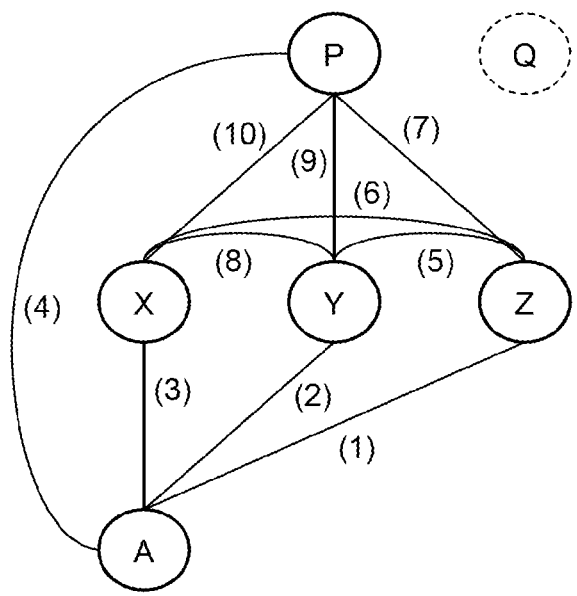
FIG. 26 is a schematic diagram (No. 14) illustrating an example of a process of removing the effect of simultaneous calls.

In the following, the example illustrated in FIG. 26 will be described. By executing the processes illustrated in FIGS. 13 to 25, the second calculating unit 153 updates the partial correlation coefficient of each of the processing types (1) to (10) and removes the effect of the processing type Q. After removing the effect of the processing type Q, the second calculating unit 153 removes the processing type Q. For example, the second calculating unit 153 removes the processing type Q from the processing types that are simultaneously called and that are associated with the combination information of "the processing type X and the processing type A" on the correlation registered in the node list 144.

Figure 27:
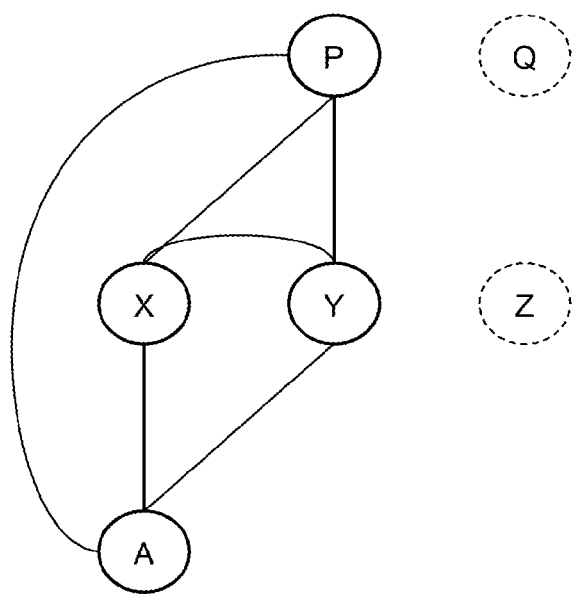
FIG. 27 is a schematic diagram (No. 15) illustrating an example of a process of removing the effect of simultaneous calls.

In the following, the example illustrated in FIG. 27 will be described. Similarly to the case in which the effect of the processing type Q is removed, the second calculating unit 153 updates the value of each of the partial correlation coefficients of the processing types by removing the effect of the processing type Z from each of the partial correlation coefficients of the processing types. After removing the effect of the processing type Z, the second calculating unit 153 removes the processing type Z. For example, the second calculating unit 153 removes the processing type Z from the processing types that are simultaneously called and that are associated with the combination information of "the processing type X and the processing type A" on the correlation registered in the node list 144.

Figure 28:
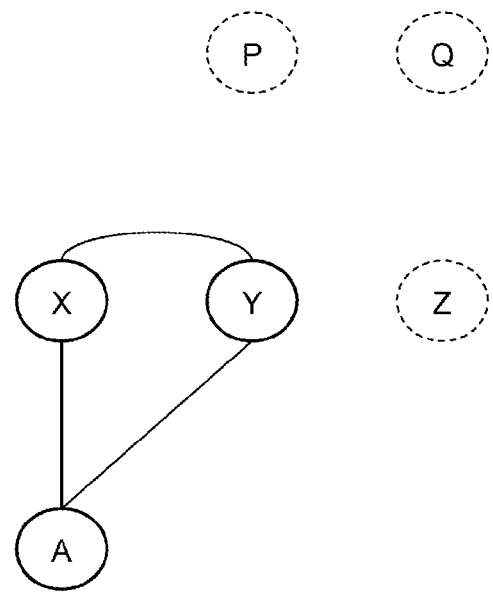
FIG. 28 is a schematic diagram (No. 16) illustrating an example of a process of removing the effect of simultaneous calls.

In the following, the example illustrated in FIG. 28 will be described. Similarly to the case in which the effect of the processing type Q is removed, the second calculating unit 153 updates the value of each of the partial correlation coefficients of the processing types by removing the effect of the processing type P from each of the partial correlation coefficients of the processing types. The second calculating unit 153 removes the effect of the processing type P and then removes the processing type P. For example, the second calculating unit 153 removes the processing type P from the processing types that are simultaneously called and that are associated with the combination information of "the processing type X and the processing type A" on the correlation registered in the node list 144.

Figure 29:
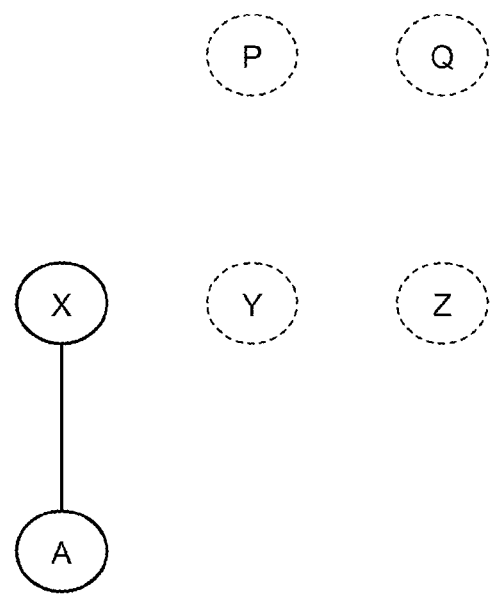
FIG. 29 is a schematic diagram (No. 17) illustrating an example of a process of removing the effect of simultaneous calls.

In the following, the example illustrated in FIG. 29 will be described. Similarly to the case in which the effect of the processing type Q is removed, the second calculating unit 153 updates the value of each of the partial correlation coefficients of the processing types by removing the effect of the processing type Y from each of the partial correlation coefficients of the processing types. After removing the effect of the processing type Y, the second calculating unit 153 removes the processing type. For example, the second calculating unit 153 removes the processing type Y from the processing types that are simultaneously called and that are associated with the combination information of "the processing type X and the processing type A" on the correlation registered in the node list 144.

By executing the processes illustrated in FIGS. 13 to 29, the second calculating unit 153 can remove the effect due to a simultaneous call from the partial correlation coefficient of the processing type X and the processing type A. The second calculating unit 153 stores, in the second partial correlation coefficient table 143b, the finally obtained partial correlation coefficient of the processing type X and the processing type A. For the other partial correlation coefficients of processing types, by performing the processes associated with the examples illustrated in FIGS. 13 to 29, the second calculating unit 153 can remove the effect due to a simultaneous call from the partial correlation coefficient of each of the processing types.

Because the first calculating unit 152 and the second calculating unit 153 executes the processes described above, the partial correlation coefficients registered in the second partial correlation coefficient table 143b becomes partial correlation coefficients from which the effect of the trend of the entire multi tiers and the effect due to the simultaneous call are removed.

The specifying unit 154 is a processing unit that specifies a combination of processing types that have the call relationship on the basis of the second partial correlation coefficient table 143b. The specifying unit 154 registers information on a combination of processing types that have the call relationship in the call relationship table 145.

The specifying unit 154 refers to a second partial correlation coefficient table 143b and specifies a combination of processing types that have a significant correlation at the level of significance α2. For example, it is assumed that the value of the level of significance α2 is 0.01. The specifying unit 154 compares the level of significance α2, the degree of freedom calculated from the number of samples obtained when a correlation coefficient is calculated (a lower number of samples of −2), and the partial correlation coefficients in the second partial correlation coefficient table 143b and then specifies a combination, which is indicated by the partial correlation coefficient, of processing types that have a significant correlation at the level of significance α2. For example, in FIG. 5, if the partial correlation coefficient PCC (X, A-T$_{APP}$, T$_{DB}$) has a value equal to or greater than the value in which correlation can be recognized in terms of the level of significance α2 and the specified degree of freedom, the specifying unit 154 specifies that the processing type X and the processing type A have a call relationship. However, it is assumed that the partial correlation coefficients illustrated in FIG. 5 are partial correlation coefficients that are obtained by the first calculating unit 152 and the second calculating unit 153 removing the effect of the trend of the entire multi tiers and the effect due to a simultaneous call. Furthermore, the number of samples mentioned here is one or more executions of each of the processing types indicated in the item of the time in FIG. 3.

The determining unit 155 is a processing unit that determines, on the basis of the call relationship table 145 and the second time series data 146, a processing type in which a response delay has occurred. The determining unit 155 displays the determination result on the displaying unit 130. In a description below, a process performed by the determining unit 155 will be specifically described.

The determining unit 155 scans the second time series data 146 and specifies a processing type in which the response time is equal to or greater than a threshold. The determining unit 155 refers to the call relationship table 145 and specifies the call relationship between processing types. From among the processing types in each of which a response time is equal to or greater than the threshold, if a response time of a processing type at the call destination is also equal to or greater than the threshold, the determining unit 155 determines that the processing type at the call destination as the processing type in which a response delay has occurred. Furthermore, from among the processing types in each of which the response time is equal to or greater than the threshold, if a response time of a processing type at the call destination is not equal to or greater than the threshold, the determining unit 155 determines that the processing type at the call source as the processing type in which a response delay has occurred.

Figure 30:
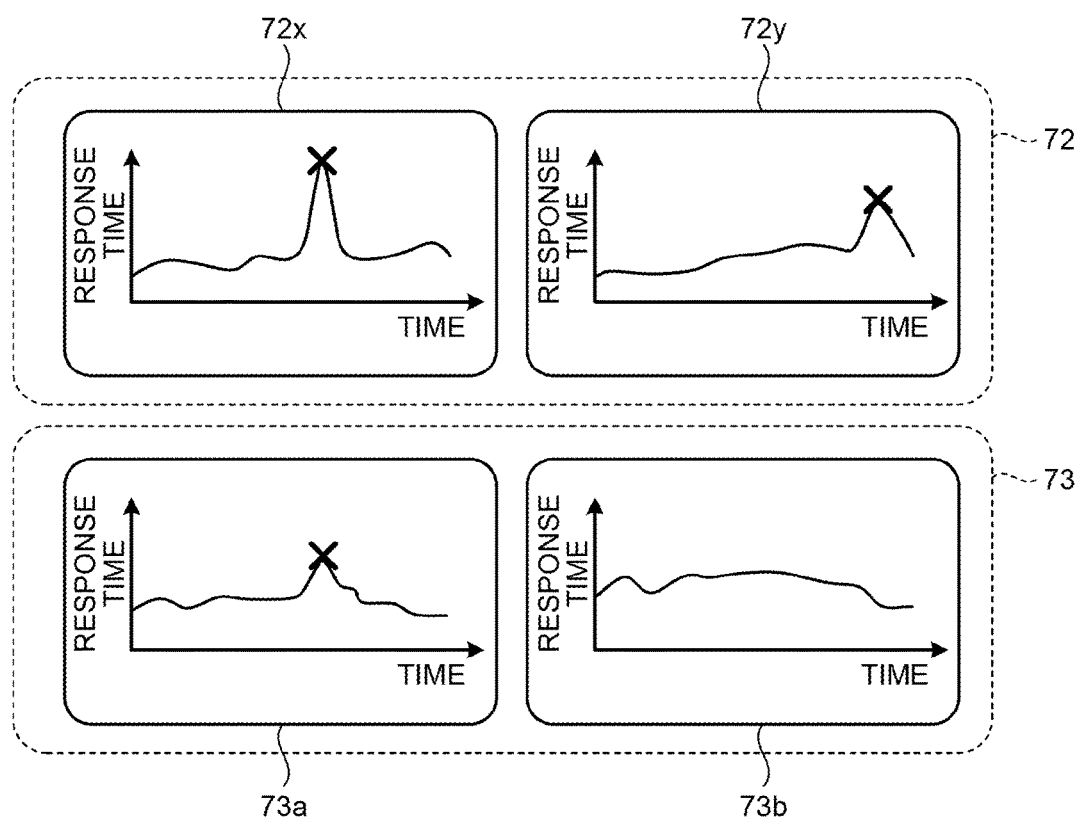
FIG. 30 is a schematic diagram illustrating an example of a process performed by a determining unit.

FIG. 30 is a schematic diagram illustrating an example of a process performed by a determining unit. In FIG. 30, response time data 72x is data that indicates the relationship between the response time of the processing type X and the time. Response time data 72y is data that indicates the relationship between the response time of the processing type Y and the time. Response time data 73a is data that indicates the relationship between the response time of the processing type A and the time. Response time data 73b is data that indicates the relationship between the response time of the processing type B and the time. Furthermore, in the example illustrated in FIG. 30, it is assumed that the processing type X and the processing type A nave the call relationship and it is assumed that the call source is the processing type X and the call destination is the processing type A. It is assumed that the processing type Y and the processing type B have the call relationship and it is assumed that the call source is the processing type Y and the call destination is the processing type B.

For example, when the determining unit 155 scans each piece of the response time data, for the processing types X, A, and Y, the response time is equal to or greater than the threshold and, from among these processing types X, A, and Y, a response delay occurs in each of the processing types X and A at the same time. Because the processing type X and the processing type A have the call relationship, the determining unit 155 determines, between the processing type X and the processing type A, the processing type A that corresponds to the call destination as the processing type in which a response delay has occurred. Furthermore, for the processing type Y, because the response time at the same time of the processing type B that corresponds to the call destination is not equal to nor greater than the threshold, the determining unit 155 determines that the processing type Y is a processing type in which a response delay occurs.

Figure 31:
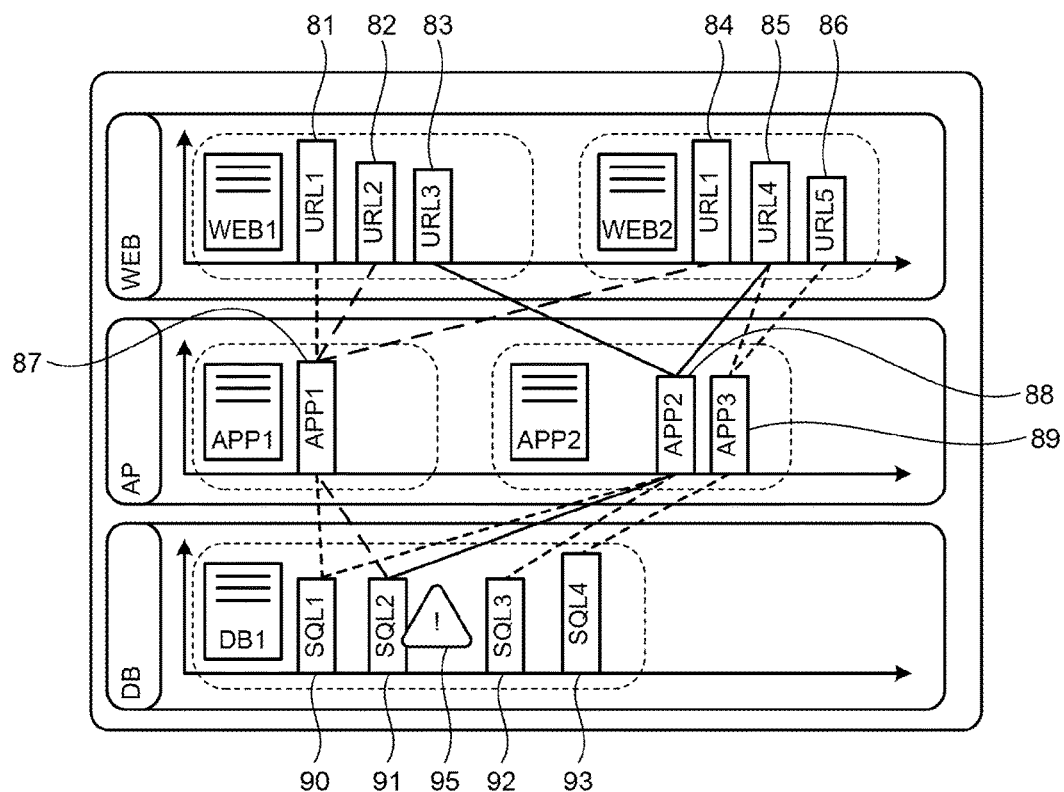
FIG. 31 is a schematic diagram illustrating an example of a screen on which the determination result obtained by the determining unit is displayed.

FIG. 31 is a schematic diagram illustrating an example of a screen on which the determination result obtained by the determining unit is displayed. In FIG. 31, a single bar corresponds to a processing type. For example, bars 81 to 86 correspond to the processing types executed in the Web tier 71. Bars 87 to 89 correspond to the processing types executed in the AP tier 72. Bars 90 to 93 correspond to the processing types executed in the DB tier 73. The determining unit 155 changes the height of each of the bars 81 to 93 in accordance with the number of executions of the processing types. For example, the determining unit 155 sets the height of the bar of the processing type with a greater number of executions to be increased. The determining unit 155 sets the link between the bars of the processing types that have the call relationship on the basis of the call relationship table 145.

The frames indicated by the dotted lines illustrated in FIG. 31 represent servers. In the example illustrated in FIG. 31, two servers are present in the Web tier 71 and the AP tier 72 and a single server is present in the DB tier 73. The determining unit 155 may also change the color of the bars in accordance with the number of times response delay occurs in the past. For example, the determining unit 155 sets, to a first color, the bar of the processing type in which response delays were observed by the number of times that is equal to or greater than a predetermined number. The determining unit 155 sets, to a second color, the bar of the processing type in which response delays were observed by the number of times that is equal to or greater than one and that is less than a predetermined number. The determining unit 155 sets, to a third color, the processing type in which a response delay has never been observed.

Furthermore, the determining unit 155 sets a mark in the bar of the processing type in which a response delay has occurred. For example, it is assumed that the bar of the processing type in which a response delay has occurred is the bar 91, the determining unit 155 sets a mark 95 in the bar 91. Furthermore, the determining unit 155 may also highlight the link connecting to the processing type in which the response delay has occurred. For example, the link between the bar 91 and the bar 88 and the link between the bar 88 and the bars 83 and 85 may also be highlighted.

Figure 32:
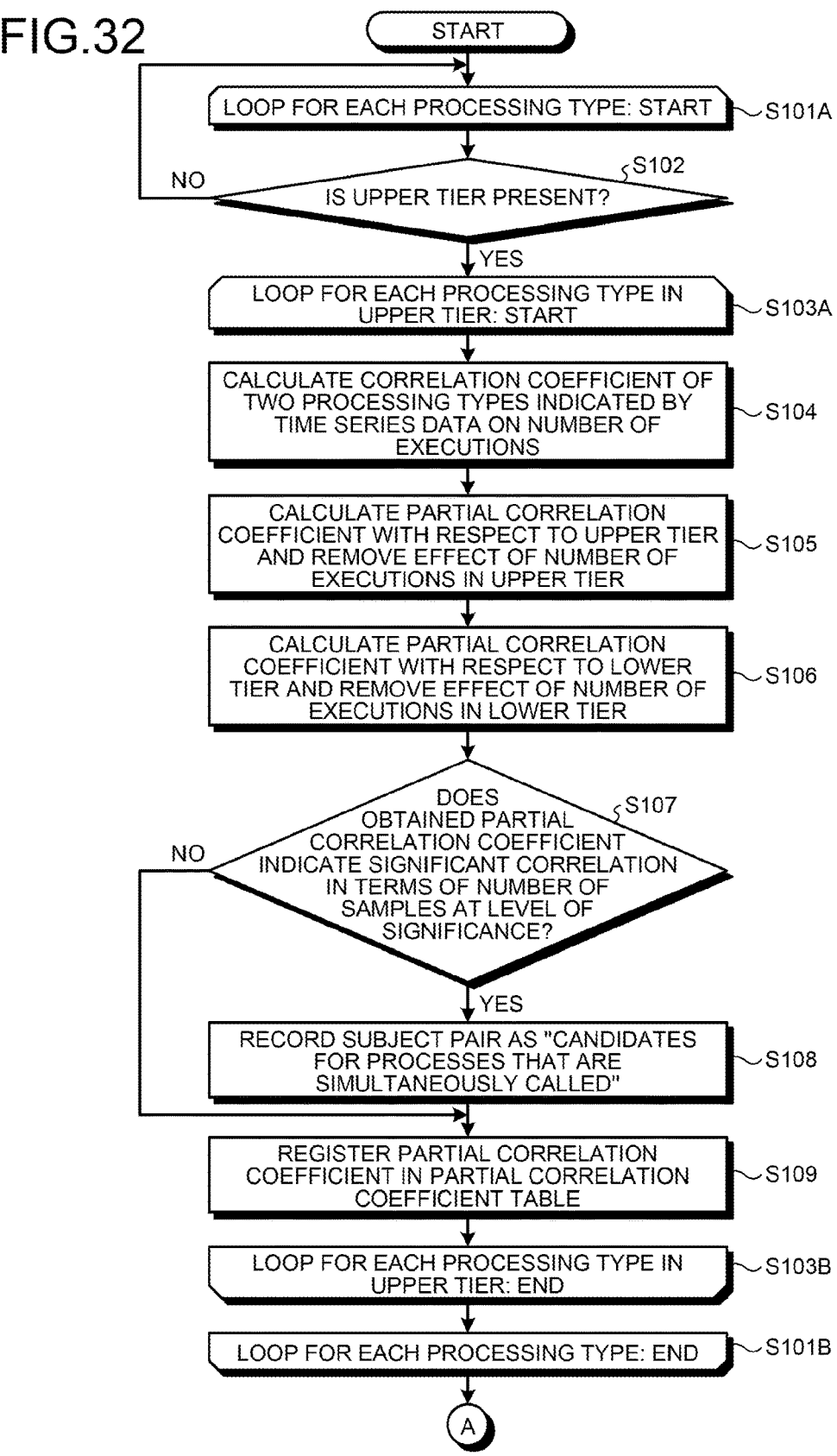
FIG. 32 is a flowchart (No. 1) illustrating the flow of a process of determining the call relationship.
Figure 33:
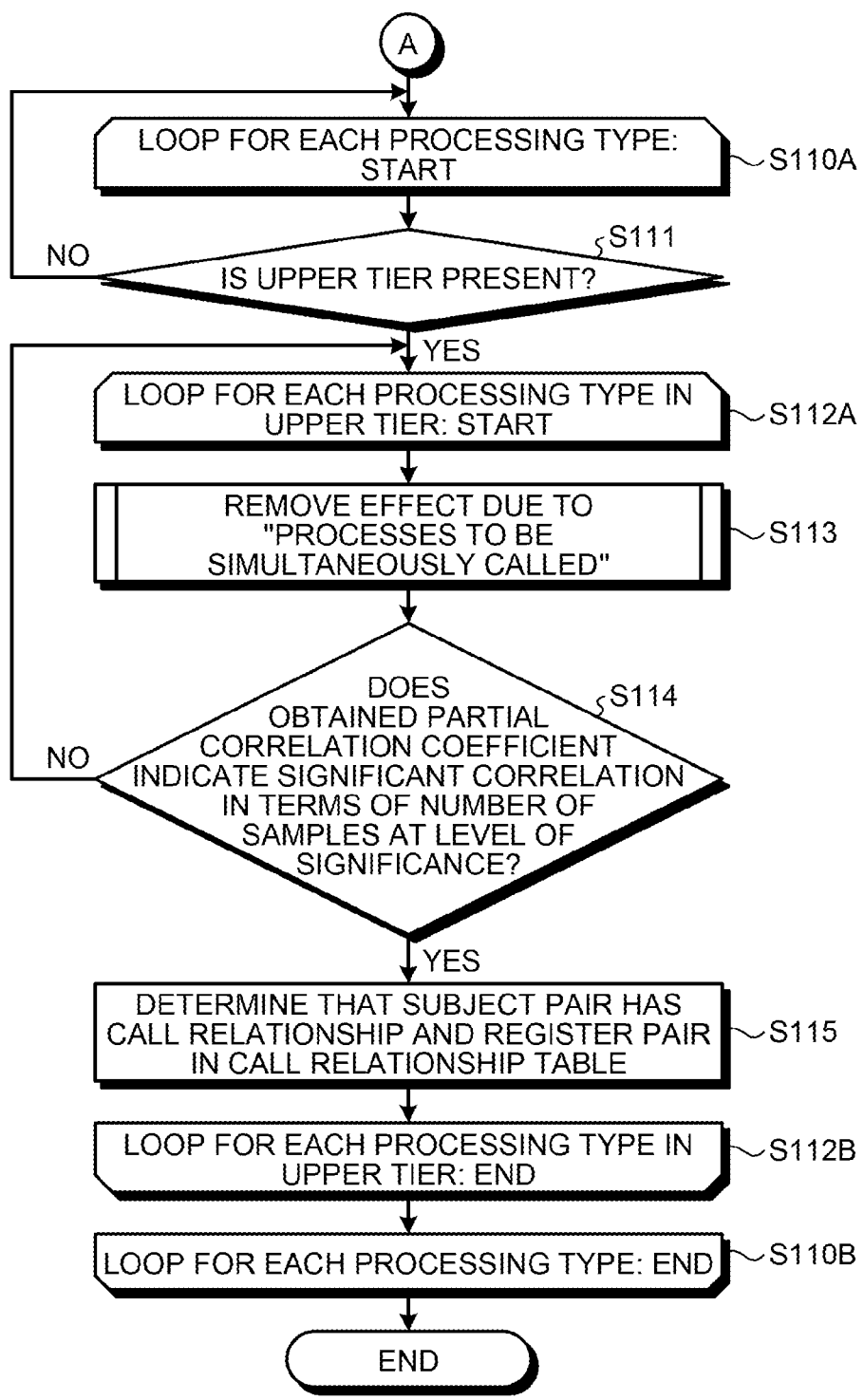
FIG. 33 is a flowchart (No. 2) illustrating the flow of a process of determining the call relationship.

In the following, the flow of a process performed by the performance diagnostic server 100 according to the embodiment will be described. FIG. 32 and FIG. 33 are flowcharts each illustrating the flow of a process of determining the call relationship. As illustrated in FIG. 32, the first calculating unit 152 in the performance diagnostic server 100 loops, for each processing type, the processes at Steps S101A to S101B and then proceeds to Step S110A after the processes have been performed on all of the processing types.

The first calculating unit 152 determines whether an upper tier is present for the current processing type (Step S102). If an upper tier is not present (No at Step S102), the first calculating unit 152 again proceeds to Step S101A.

If an upper tier is present (Yes at Step S102), the first calculating unit 152 proceeds to Step S103A. The first calculating unit 152 loops the processes at Steps S103A to S103B for each processing type in an upper tier and, after the processes are performed on all of the processing types in the upper level, the first calculating unit 152 exits from the loop.

The first calculating unit 152 calculates a correlation coefficient of two processing types indicated by time series data on the number of executions (Step S104). The first calculating unit 152 calculates a partial correlation coefficient with respect to an upper tier and removes the effect of the number of executions in the upper tier (Step S105). The first calculating unit 152 calculates a partial correlation coefficient with respect to a lower tier and removes the effect of the number of executions in the lower tier (Step S106).

The second calculating unit 153 determines whether the obtained partial correlation coefficient indicates a significant correlation in terms of the number of samples at the level of significance (Step S107). If the obtained partial correlation coefficient does not indicate a significant correlation (No at Step S107), the second calculating unit 153 proceeds to Step S109. In contrast, if the obtained partial correlation coefficient indicates a significant correlation (Yes at Step S107), the second calculating unit 153 records the subject pair in the node list 144 as "the candidates for the processes that are simultaneously called" (Step S108).

The first calculating unit 152 registers the partial correlation coefficient in the partial correlation coefficient table 143 (Step S109).

A description will be given of the flowchart illustrated in FIG. 33. The second calculating unit 153 in the performance diagnostic server 100 loops the processes at Steps S110A to S110B for each processing type and ends the process of determining the call relationship after the processes performed on all of the processing types have been ended.

The second calculating unit 153 determines whether an upper tier is present for the current processing type (Step S111). If an upper tier is not present (No at Step S111), the second calculating unit 153 again proceeds to Step S110A.

If an upper tier is present (Yes at Step S111), the second calculating unit 153 proceeds to Step S112A. The second calculating unit 153 loops the processes at Steps S112A to S112B for each processing type in the upper tier and exits the loop after the processes have been performed on all of the processing types in the upper tier.

The second calculating unit 153 removes the effect due to the "processes to be simultaneously called" (Step S113). The second calculating unit 153 determines whether the obtained partial correlation coefficient indicates a significant correlation in terms of the number of samples at the level of significance (Step S114). If the obtained partial correlation coefficient does not indicate a significant correlation (No at Step S114), the second calculating unit 153 again proceeds to Step S112A. In contrast, if the obtained partial correlation coefficient indicates a significant correlation (Yes at Step S114), the second calculating unit 153 determines that the subject pair has the call relationship and then registers the pair in the call relationship table (Step S115).

Figure 34:
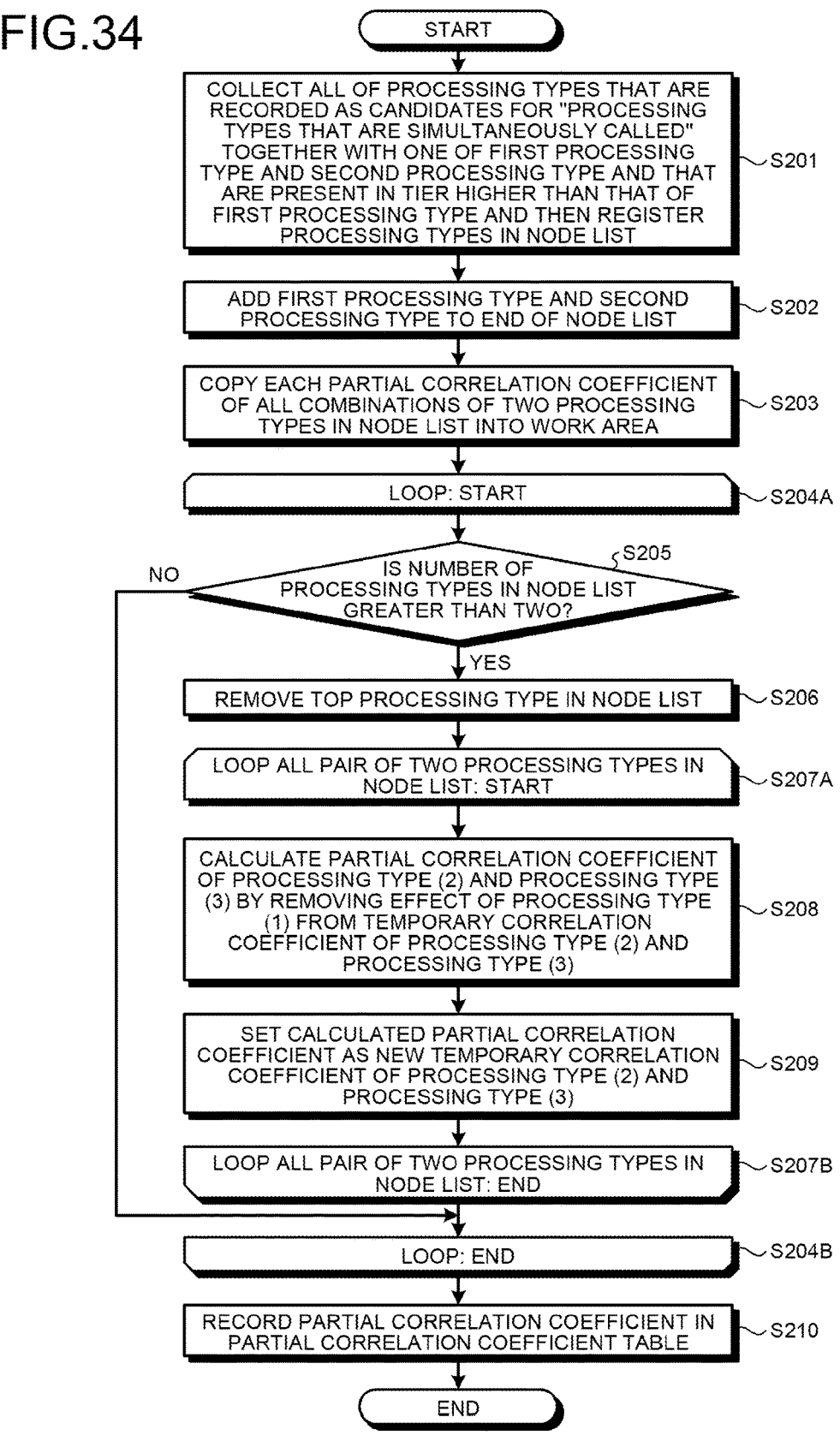
FIG. 34 is a flowchart illustrating the flow of a process of removing the effect due to the processes simultaneously called.

In the following, a description will be given of an example of the flow of a process of removing the effect due to the "processes to be simultaneously called" indicated by Step S113 illustrated in FIG. 33. FIG. 34 is a flowchart illustrating the flow of a process of removing the effect due to the processes simultaneously called. As illustrated in FIG. 34, the second calculating unit 153 collects all of the processing types that are recorded as candidates for the "processing types that are simultaneously called" together with one of the first processing type and the second processing type and that are in a tier higher than the tier of the first processing type and then registers the processing types in the node list 144 (Step S201).

The second calculating unit 153 adds the first processing type and the second processing type to the terminal in the node list 144 (Step S202). In the node list 144 illustrated in FIG. 6, the second calculating unit 153 registers information corresponding to the first processing type and the second processing type in the combination information on a correlation coefficient. However, the embodiment is not limited thereto, as indicated at Step S202, the second calculating unit 153 may also add information corresponding to the first processing type and the second processing type after performing the processing types that are simultaneously called.

For two processing types in the node list 144, the second calculating unit 153 copies each of the partial correlation coefficients into a work area in the storing unit 140 (Step S203). The second calculating unit 153 loops the processes at Steps S204A to S204B.

The second calculating unit 153 determines whether the number of processing types in the node list 144 is greater than two (Step S205). If the number of processing types in the node list 144 is not greater than two (No at Step S205), the second calculating unit 153 exits the loop and proceeds to Step S210.

In contrast, if the number of processing types in the node list 144 is greater than two (Yes at Step S205), the second calculating unit 153 removes the top processing type in the node list 144 (Step S206). This top processing type is represented by a processing type (1).

For all of the pairs of two processing types in the node list 144, the second calculating unit 153 loops the processes at Steps S207A to S207B. A certain pair of certain processing types is represented by a processing type (2) and a processing type (3).

By removing the effect of the processing type (1) from a temporary correlation coefficient of the processing type (2) and the processing type (3), the second calculating unit 153 calculates a partial correlation coefficient of the processing type (2) and the processing type (3) (Step S208).

The second calculating unit 153 sets the calculated partial correlation coefficient as a temporary correlation coefficient of the processing type (2) and the processing type (3) (Step S209).

After the end of the loop of the processes at Steps S207A to S207B, the second calculating unit 153 records a partial correlation coefficient of processing types in the partial correlation coefficient table (Step S210) and ends the process of removing the effect due to the "processes that are simultaneously called".

Figure 35:
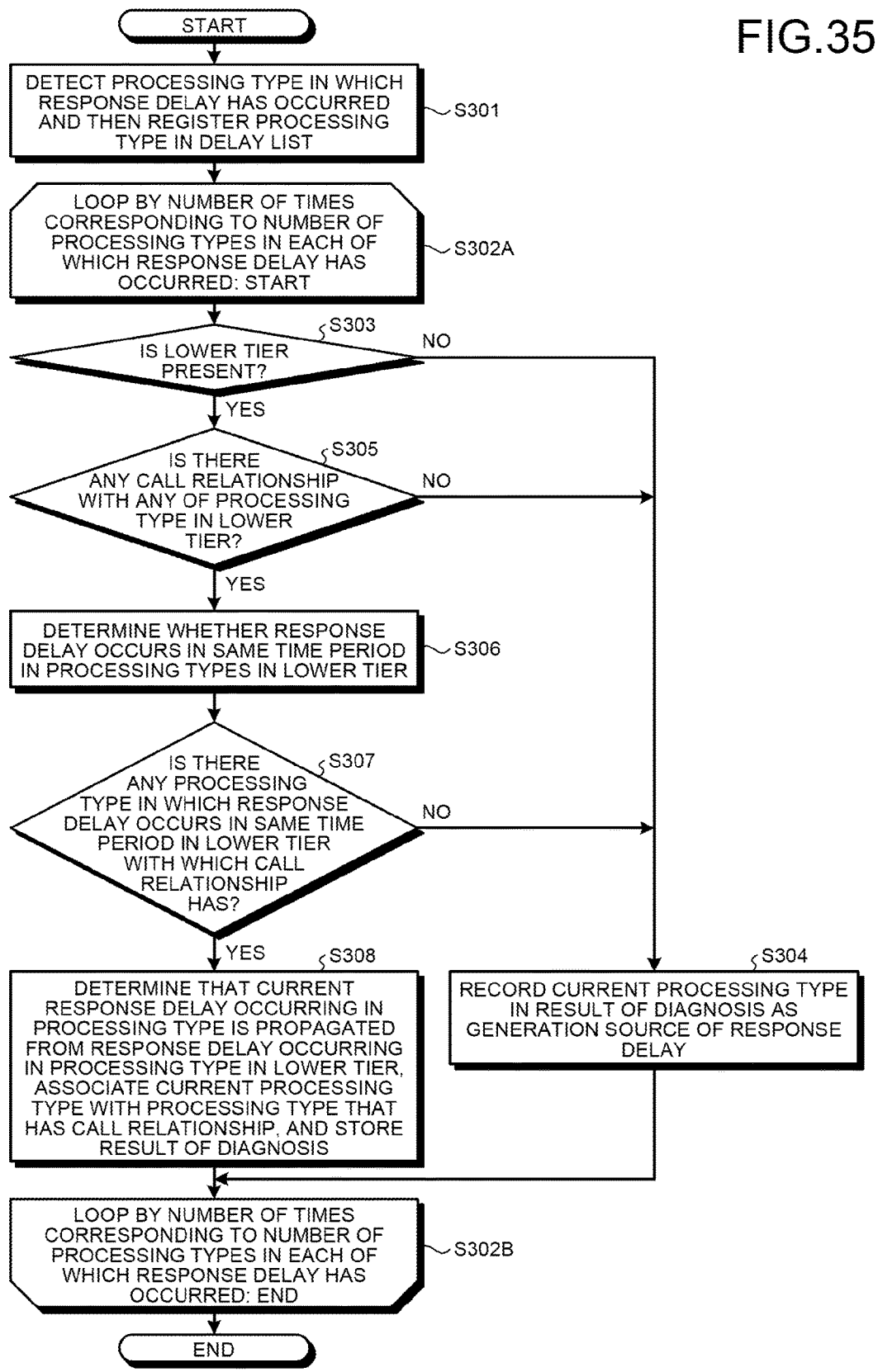
FIG. 35 is a flowchart illustrating the flow of a process of determining the processing type in which a response delay occurs.

In the following, a description will be given of the flow of a process of determining a processing type in which a response delay has occurred. FIG. 35 is a flowchart illustrating the flow of a process of determining the processing type in which a response delay occurs. As illustrated in FIG. 35, the determining unit 155 in the performance diagnostic server 100 detects a processing type in which a response delay has occurred and then registers the processing type in the delay list (Step S301). Here, the drawing of the delay list will be omitted.

The determining unit 155 loops the processes at Steps S302A to Step S302B by the number of times corresponding to the number of processing types in each of which a response delay has occurred. The determining unit 155 exits the loop after the process has ended on all of the processing types in each of which a response delay has occurred.

The determining unit 155 determines whether a lower level tier is present for the current processing type (Step S303). If a lower level tier is not present (No at Step S303), the determining unit 155 records the current processing type in the result of diagnosis as the generation source of the response delay and then proceeds to Step S304. Here, the drawing of the list of the diagnosis will be omitted.

In contrast, if a lower tier is present (Yes at Step S303), the determining unit 155 determines whether a call relationship is present between the current processing type and any of the processing types in a lower tier (Step S305). If no call relationship is present in any of the processing types in a lower tier (No at Step S305), the determining unit 155 proceeds to Step S304.

In contrast, if a call relationship is present in one of the processing types in a lower tier (Yes at Step S305), the determining unit 155 determines whether a response delay occurs in the same time period in the processing types in the lower tier (Step S306). If a processing type in which a response delay occurs in the same time period is not present in the lower tier that has the call relationship (No at Step S307), the determining unit 155 proceeds to Step S304.

In contrast, if a processing type in which a response delay occurs in the same time period is present in the lower tier that has the call relationship (Yes at Step S307), the determining unit 155 proceeds to Step S308.

The determining unit 155 determines that the response delay occurring in the current processing type is propagated from the response delay occurring in the processing type in a lower tier. The determining unit 155 associates the current processing type with the processing type that has the call relationship with the current processing type and then stores the result of the diagnosis (Step S308).

In the following, an advantage of the performance diagnostic server 100 according to the embodiment will be described. The performance diagnostic server 100 calculates a partial correlation coefficient by removing the effect of the trend of the entire multi tiers from each of the correlation coefficients of processing types and then updates each of the correlation coefficients of the processing types. Consequently, according to the performance diagnostic server 100, it is possible to calculate a correlation coefficient that is related to processing types and that is obtained by removing the effect of requests from the entire tier and thus the call relationship between processing types can be accurately specified.

The performance diagnostic server 100 calculates a partial correlation coefficient by removing the effect due to a simultaneous call from each of the correlation coefficients of processing types and then updates each of the correlation coefficients of the processing types. Consequently, according to the performance diagnostic server 100, it is possible to calculate a correlation coefficient of processing types from which the effect due to the simultaneous call has been removed. Consequently, the call relationship between processing types can be accurately specified.

Figure 36:
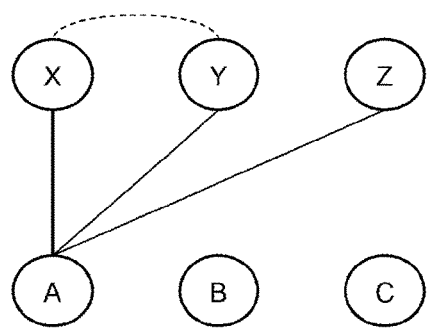
FIG. 36 is a schematic diagram illustrating an example of an effect due to simultaneous calls.

FIG. 36 is a schematic diagram illustrating an example of an effect due to simultaneous calls. In FIG. 36, for example, if the processing type X and the processing type Y have the simultaneously called relationship, the correlation coefficient of the processing type X and the processing type Y becomes large. Furthermore, if the processing type X and the processing type A have the call relationship, because the processing type X and the processing type Y are simultaneously called, the correlation coefficient of the processing type Y and the processing type A becomes high even though no call relationship is present between the processing type Y and the processing type A. Consequently, it is erroneously determined that the processing type Y and the processing type A have the call relationship. However, because the performance diagnostic server 100 removes the effect due to the simultaneous call described above, an erroneous determination can be prevented.

From among all of the processing types that are present in the tiers higher than that of the subject processing type, on the basis of the correlation coefficient of the subject processing types, the performance diagnostic server 100 narrows down processing types that are candidates for a simultaneous call. Then, on the basis of the narrowed down processing types, the performance diagnostic server 100 removes the effect due to the simultaneous call. Consequently, a calculation cost can be reduced.

The performance diagnostic server 100 removes the effect of the trend of the entire multi tiers; specifies the call relationship on the basis of each of the correlation coefficients of processing types from which the effect due to the simultaneous call has been removed; and determines, on the basis of this call relationship, a processing type that is the generation source of a response delay. Consequently, the processing type that is the generation source of a response delay can be accurately specified.

Figure 37:
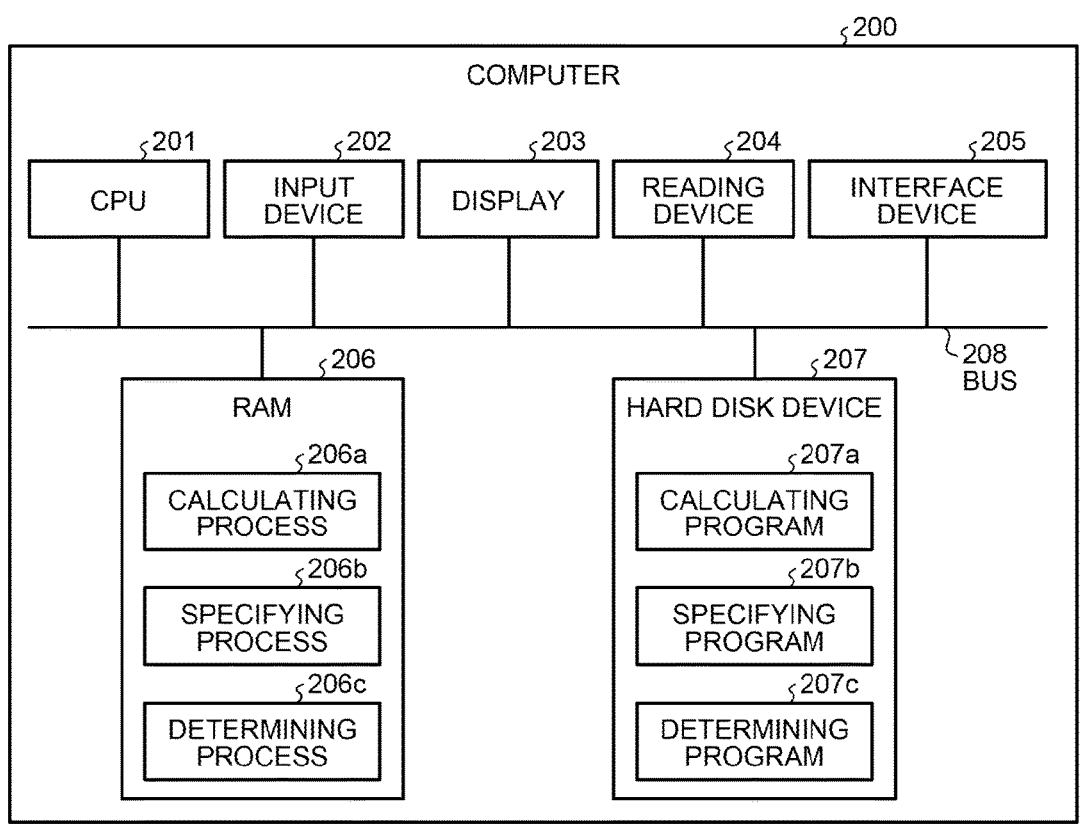
FIG. 37 is a block diagram illustrating a computer that executes a correlation coefficient calculating program.
Figure 38:
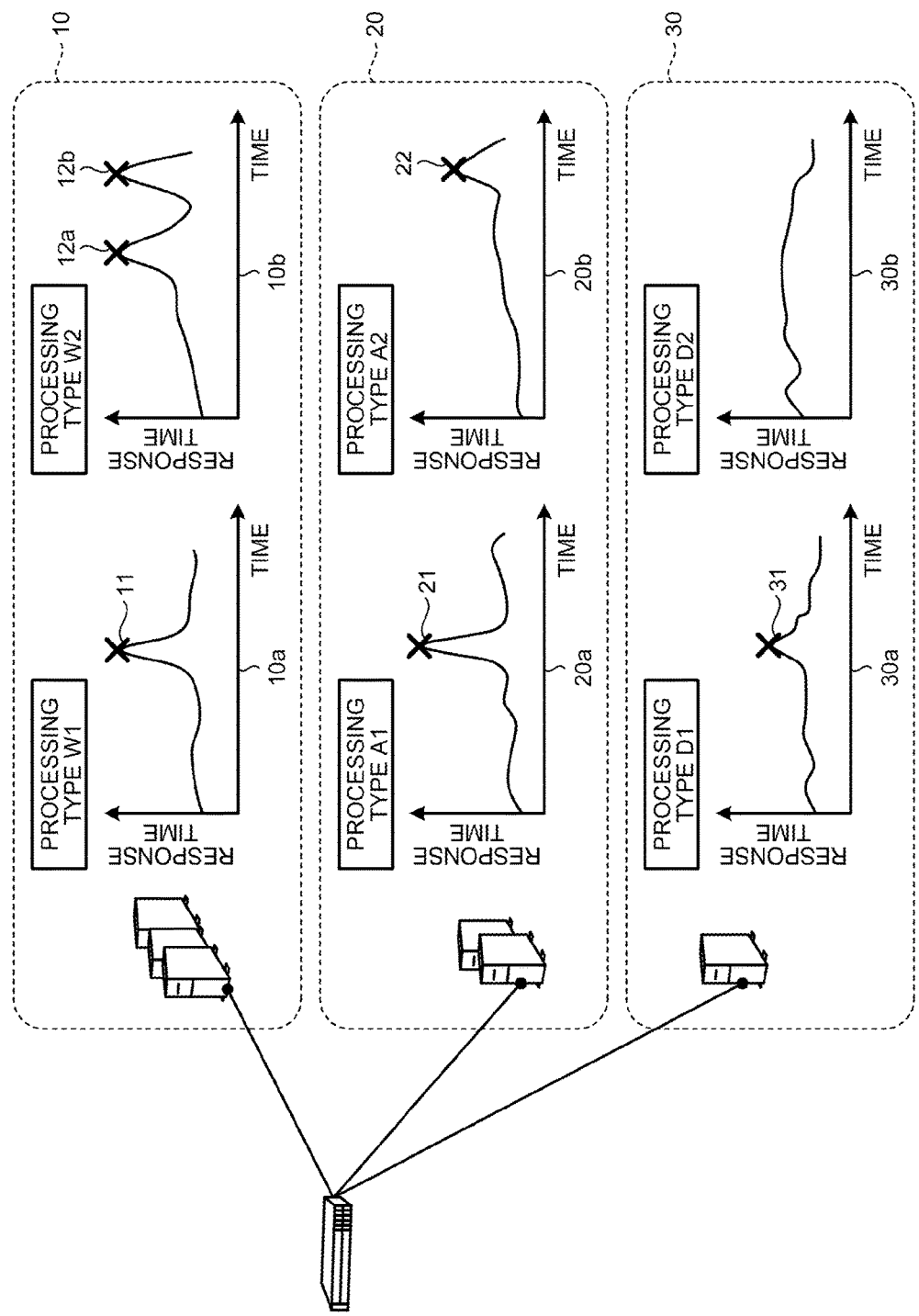
FIG. 38 is a schematic diagram illustrating an example of transmission of a response delay between tiers.
Figure 39:
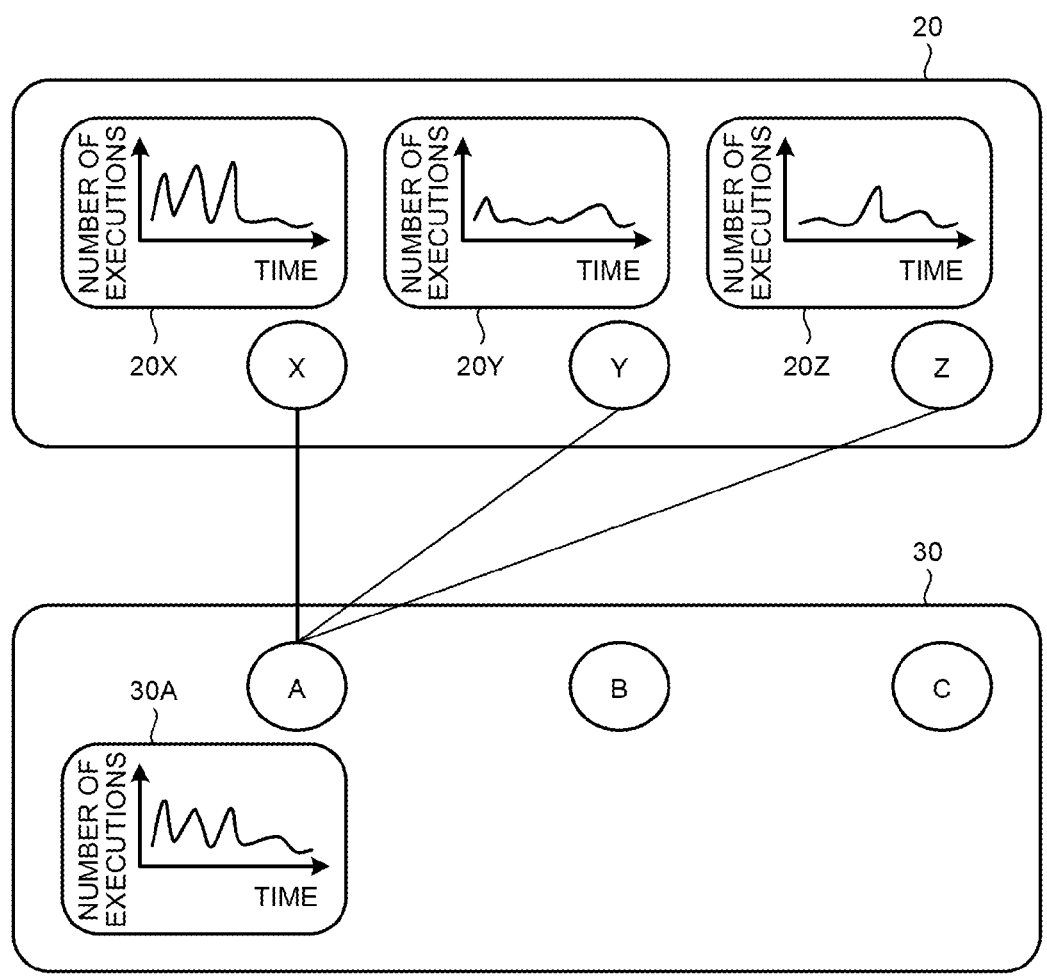
FIG. 39 is a schematic diagram illustrating a conventional technology 1.
Figure 40:
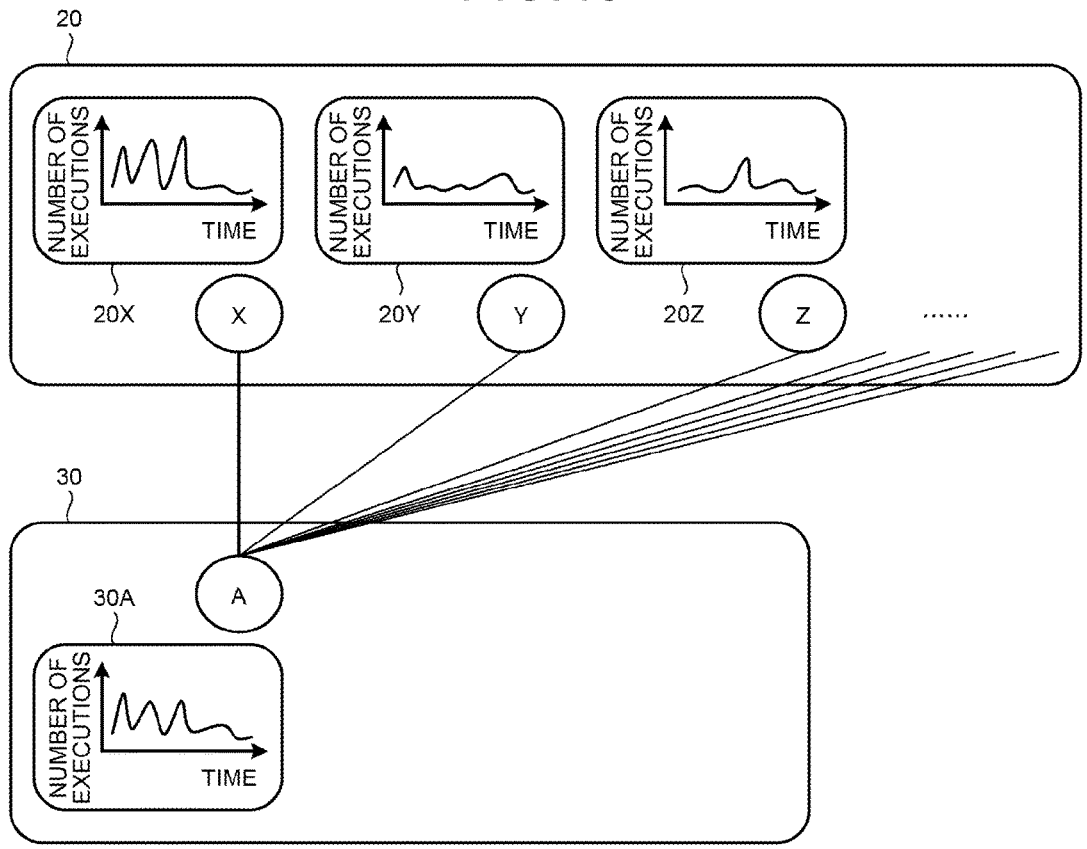
FIG. 40 is a schematic diagram (No. 1) illustrating a conventional technology 2.
Figure 41:
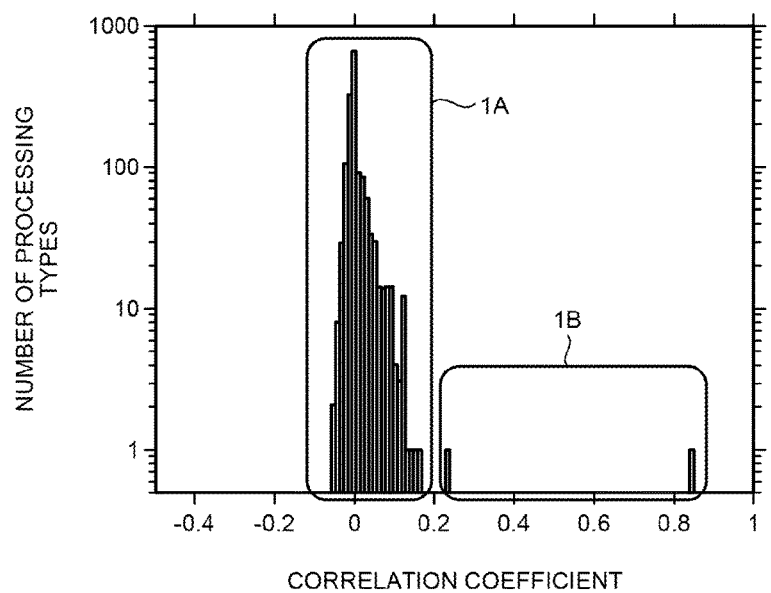
FIG. 41 is a schematic diagram (No. 2) illustrating a conventional technology 2.
Figure 42:
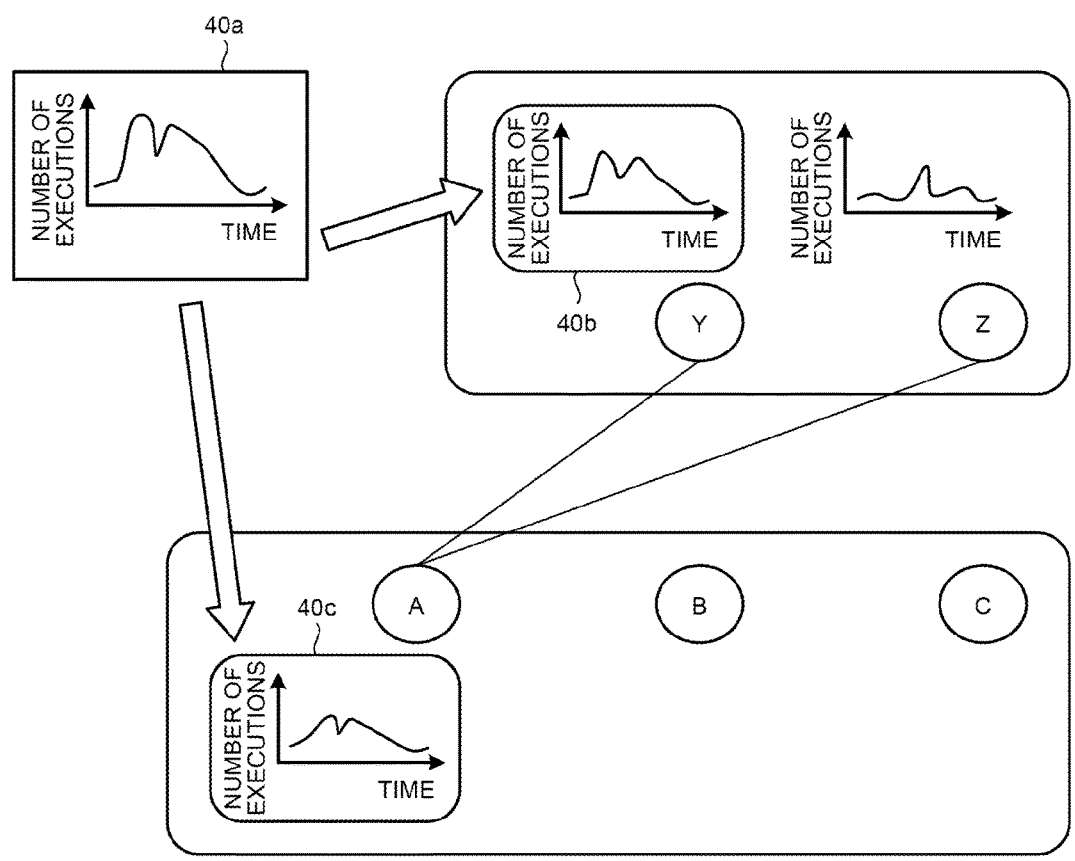
FIG. 42 is a schematic diagram illustrating an example of an effect due to requests from the entire tiers.

In the following, a description will be given of an example of a computer that executes a correlation coefficient calculating program that implements the same function as that performed by the performance diagnostic server 100 described in the above embodiment. FIG. 37 is a block diagram illustrating a computer that executes a correlation coefficient calculating program.

As illustrated in FIG. 37, a computer 200 includes a CPU 201 that executes various arithmetic processing, an input device 202 that receives an input of data from a user, and a display 203. Furthermore, the computer 200 includes a reading device 204 that reads a program or the like from a storage medium and an interface device 205 that sends and receives data to and from the other computer via a network. Furthermore, the computer 200 includes a RAM 206 and a hard disk device 207 that temporarily store therein various kinds of information. Furthermore, each of the devices 201 to 207 is connected to a bus 208.

The hard disk device 207 includes a calculating program 207a, a specifying program 207b, and a determining program 207c. The CPU 201 reads the calculating program 207a, the specifying program 207b, and the determining program 207c and loads the programs in the RAM 206. The calculating program 207a functions as a calculating process 206a. The specifying program 207b functions as a specifying process 206b. The determining program 207c functions as a determining process 206c.

For example, the calculating process 206a corresponds to the first calculating unit 152 and the second calculating unit 153. The specifying process 206b corresponds to the specifying unit 154. The determining process 206c corresponds to the determining unit 155.

Furthermore, the calculating program 207a, the specifying program 207b, and the determining program 207c do not need to be stored in the hard disk device 207 from the beginning. For example, the programs are stored in a "portable physical medium", such as a flexible disk (FD), a CD-ROM, a DVD disk, a magneto-optic disk, an IC CARD, or the like that is to be inserted into the computer 200. Then, the computer 200 may read and execute the calculating program 207a, the specifying program 207b, and the determining program 207c from the portable physical medium.

According to an aspect of an embodiment of the present invention, an advantage is provided in that it is possible to calculate a correlation coefficient of processes from which the effect due to requests from the entire tiers has been removed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method for determining a response delay source using correlation coefficients, the method, executed by a computer, comprising:

calculating, for a system that is made up of multiple tiers including a Web tier, an application tier and a database tier, on each of the multiple tiers a processing type being executed on a server included in a respective tier, by reading data from a storing unit that stores time-series data of a number of requests on a processing type executed in the system wherein the time series data is used for calculating correlation coefficients, time series data of a total number of requests of processing types included in a tier;

calculating a first correlation coefficient of time series data of a number of requests on a first processing type in the application tier and time series data of a number of requests on a second processing type in the database tier;

calculating a second correlation coefficient of time series data of a total number of requests of processing types in the application tier and the time series data of a number of requests on the first processing type;

calculating a third correlation coefficient of time series data of the total number of requests of processing types in the application tier and time series data of a total number of requests of processing types in the database tier;

calculating a fourth correlation coefficient of time series data of the total number of requests of processing types in the database tier and the time series data of a number of requests on the second processing type;

calculating a fifth correlation coefficient of the time series data of the total number of requests of processing types in the application tier and the time series data of a number of requests on the second processing type;

calculating a sixth correlation coefficient of the time series data of the total number of requests of processing types in the database tier and the time series data of a number of requests on the first processing type;

calculating a sixth partial correlation coefficient by removing an effect of all requests of processing types in the application tier on the sixth correlation coefficient, using the second correlation coefficient and the third correlation coefficient;

calculating a fourth partial correlation coefficient by removing the effect of all requests of processing types in the application tier on the fourth correlation coefficient, using the third correlation coefficient and the fifth correlation coefficient;

calculating a first partial correlation coefficient by removing the effect of all requests of processing types in the application tier on the first correlation coefficient, using the second correlation coefficient and the fifth correlation coefficient;

calculating a corrected first correlation coefficient, that is a corrected correlation coefficient of the first correlation coefficient, the corrected first correlation coefficient being obtained by removing the effect of all requests in the database tier on the first partial correlation coefficient, using the sixth partial correlation coefficient and the fourth partial correlation coefficient;

specifying a third processing type that is present in the application tier and that is different from the first processing type and specifying a fourth processing type that is present in the Web tier higher than the application tier;

obtaining a seventh correlation coefficient of the time series data on the first processing type and time series data of a number of requests on the third processing type;

obtaining an eighth correlation coefficient of the time series data on the first processing type and time series data of a number of requests on the fourth processing type;

obtaining a ninth correlation coefficient of the time series data on the second processing type and the time series data on the third processing type;

obtaining a tenth correlation coefficient of the time series data on the third processing type and the time series data on the fourth processing type;

obtaining an eleventh correlation coefficient of the time series data on the second processing type and the time series data on the fourth processing type;

updating the ninth correlation coefficient on the basis of the tenth correlation coefficient and on the basis of the eleventh correlation coefficient;

updating the seventh correlation coefficient on the basis of the eighth correlation coefficient and on the basis of the tenth correlation coefficient;

firstly updating the corrected first correlation coefficient as a firstly updated first correlation coefficient, on the basis of the eighth correlation coefficient and on the basis of the eleventh correlation coefficient;

secondly updating the firstly updated first correlation coefficient as a secondly updated first correlation coefficient on the basis of the updated seventh correlation coefficient and on the basis of the updated ninth correlation coefficient, to remove the effect due to a simultaneous call by the processing types that are executed between tiers on the corrected first correlation coefficient;

specifying, based on the secondly updated first correlation coefficient and other updated correlation coefficients for other processing types, a pair of processing types that have a significant correlation with each other as being in a call relationship, and registering the pair of processing types in a call relationship table in the storing unit;

acquiring time series data indicating a response time of the processing types that are executed between tiers from the system; and specifying, when the acquired time series data on the first processing type indicates a response delay occurring in the first processing type, from pairs of processing types registered in the call relationship table a processing type that is in the call relationship with the first processing type, determining whether a response delay occurs in the processing type, and outputting a determination result wherein the determination result indicates that the response delay is propagated from the processing type to the first processing type when the processing type is executed in a tier lower than a tier in which the first processing type is executed, and the acquired time series data on the processing type indicates a response delay occurring in the processing type in a same time period as for the first processing type.

2. The correlation coefficient calculation method according to claim 1, wherein the specifying the third processing type specifies, from among a plurality of third processing types, the third processing type that has a significant correlation with the second processing type and specifies, from among a plurality of fourth processing types, the fourth processing type that has a significant correlation with the first processing type.

3. A non-transitory computer-readable recording medium having stored therein a program that determines a response delay source using correlation coefficients by causing a computer to execute a process comprising:

calculating, for a system that is made up of multiple tiers including a Web tier, an application tier and a database tier, on each of the multiple tiers a processing type being executed on a server included in a respective tier, by reading data from a storing unit that stores time-series data of a number of requests on a processing type executed in the system wherein the time series data is used for calculating correlation coefficients, time series data of a total number of requests of processing types included in a tier;

calculating a first correlation coefficient of time series data of a number of requests on a first processing type in the application tier and time series data of a number of requests on a second processing type in the database tier;

calculating a second correlation coefficient of time series data of a total number of requests of processing types in the application tier and the time series data of a number of requests on the first processing type;

calculating a third correlation coefficient of time series data of the total number of requests of processing types in the application tier and time series data of a total number of requests of processing types in the database tier;

calculating a fourth correlation coefficient of time series data of the total number of requests of processing types in the database tier and the time series data of a number of requests on the second processing type;

calculating a fifth correlation coefficient of the time series data of the total number of requests of processing types in the application tier and the time series data of a number of requests on the second processing type;

calculating a sixth correlation coefficient of the time series data of the total number of requests of processing types in the database tier and the time series data of a number of requests on the first processing type;

calculating a sixth partial correlation coefficient by removing an effect of all requests of processing types in the application tier on the sixth correlation coefficient, using the second correlation coefficient and the third correlation coefficient;

calculating a fourth partial correlation coefficient by removing the effect of all requests of processing types in the application tier on the fourth correlation coefficient, using the third correlation coefficient and the fifth correlation coefficient;

calculating a first partial correlation coefficient by removing the effect of all requests of processing types in the application tier on the first correlation coefficient, using the second correlation coefficient and the fifth correlation coefficient;

calculating a corrected first correlation coefficient, that is a corrected correlation coefficient of the first correlation coefficient, the corrected first correlation coefficient being obtained by removing the effect of all requests in the database tier on the first partial correlation coefficient, using the sixth partial correlation coefficient and the fourth partial correlation coefficient;

specifying a third processing type that is present in the application tier and that is different from the first processing type and specifying a fourth processing type that is present in the Web tier higher than the application tier;

obtaining a seventh correlation coefficient of the time series data on the first processing type and time series data of a number of requests on the third processing type;

obtaining an eighth correlation coefficient of the time series data on the first processing type and time series data of a number of requests on the fourth processing type;

obtaining a ninth correlation coefficient of the time series data on the second processing type and the time series data on the third processing type;

obtaining a tenth correlation coefficient of the time series data on the third processing type and the time series data on the fourth processing type;

obtaining an eleventh correlation coefficient of the time series data on the second processing type and the time series data on the fourth processing type;

updating the ninth correlation coefficient on the basis of the tenth correlation coefficient and on the basis of the eleventh correlation coefficient;

updating the seventh correlation coefficient on the basis of the eighth correlation coefficient and on the basis of the tenth correlation coefficient;

firstly updating the corrected first correlation coefficient as a firstly updated first correlation coefficient, on the basis of the eighth correlation coefficient and on the basis of the eleventh correlation coefficient;

secondly updating the firstly updated first correlation coefficient as a secondly updated first correlation coefficient on the basis of the updated seventh correlation coefficient and on the basis of the updated ninth correlation coefficient, to remove the effect due to a simultaneous call by the processing types that are executed between tiers on the corrected first correlation coefficient;

specifying, based on the secondly updated first correlation coefficient and other updated correlation coefficients for other processing types, a pair of processing types that have a significant correlation with each other as being in a call relationship, and registering the pair of processing types in a call relationship table in the storing unit;

acquiring time series data indicating a response time of the processing types that are executed between tiers from the system; and specifying, when the acquired time series data on the first processing type indicates a response delay occurring in the first processing type, from pairs of processing types registered in the call relationship table a processing type that is in the call relationship with the first processing type, determining whether a response delay occurs in the processing type, and outputting a determination result wherein the determination result indicates that the response delay is propagated from the processing type to the first processing type when the processing type is executed in a tier lower than a tier in which the first processing type is executed, and the acquired time series data on the processing type indicates a response delay occurring in the processing type in a same time period as for the first processing type.

4. The non-transitory computer-readable recording medium according to claim 3, wherein the specifying the third processing type specifies, from among a plurality of third processing types, the third processing type that has a significant correlation with the second processing type and specifies, from among a plurality of fourth processing types, the fourth processing type that has a significant correlation with the first processing type.

5. A device for determining a response delay source using correlation coefficients, the device comprising:

a memory; and a processor coupled to the memory, wherein the processor executes a process comprising:

calculating, for a system that is made up of multiple tiers including a Web tier, an application tier and a database tier, on each of the multiple tiers a processing type being executed on a server included in a respective tier, by reading data from a storing unit that stores time-series data of a number of requests on a processing type executed in the system wherein the time series data is used for calculating correlation coefficients, time series data of a total number of requests of processing types included in a tier;

calculating a first correlation coefficient of time series data of a number of requests on a first processing type in the application tier and time series data of a number of requests on a second processing type in the database tier;

calculating a second correlation coefficient of time series data of a total number of requests of processing types in the application tier and the time series data of a number of requests on the first processing type;

calculating a third correlation coefficient of time series data of the total number of requests of processing types in the application tier and time series data of a total number of requests of processing types in the database tier;

calculating a fourth correlation coefficient of time series data of the total number of requests of processing types in the database tier and the time series data of a number of requests on the second processing type;

calculating a fifth correlation coefficient of the time series data of the total number of requests of processing types in the application tier and the time series data of a number of requests on the second processing type;

calculating a sixth correlation coefficient of the time series data of the total number of requests of processing types in the database tier and the time series data of a number of requests on the first processing type;

calculating a sixth partial correlation coefficient by removing an effect of all requests of processing types in the application tier on the sixth correlation coefficient, using the second correlation coefficient and the third correlation coefficient;

calculating a fourth partial correlation coefficient by removing the effect of all requests of processing types in the application tier on the fourth correlation coefficient, using the third correlation coefficient and the fifth correlation coefficient;

calculating a first partial correlation coefficient by removing the effect of all requests of processing types in the application tier on the first correlation coefficient, using the second correlation coefficient and the fifth correlation coefficient;

calculating a corrected first correlation coefficient, that is a corrected correlation coefficient of the first correlation coefficient, the corrected first correlation coefficient being obtained by removing the effect of all requests in the database tier on the first partial correlation coefficient, using the sixth partial correlation coefficient and the fourth partial correlation coefficient;

specifying a third processing type that is present in the application tier and that is different from the first processing type and specifying a fourth processing type that is present in the Web tier higher than the application tier;

obtaining a seventh correlation coefficient of the time series data on the first processing type and time series data of a number of requests on the third processing type;

obtaining an eighth correlation coefficient of the time series data on the first processing type and time series data of a number of requests on the fourth processing type;

obtaining a ninth correlation coefficient of the time series data on the second processing type and the time series data on the third processing type;

obtaining a tenth correlation coefficient of the time series data on the third processing type and the time series data on the fourth processing type;

obtaining an eleventh correlation coefficient of the time series data on the second processing type and the time series data on the fourth processing type;

updating the ninth correlation coefficient on the basis of the tenth correlation coefficient and on the basis of the eleventh correlation coefficient;

updating the seventh correlation coefficient on the basis of the eighth correlation coefficient and on the basis of the tenth correlation coefficient;

firstly updating the corrected first correlation coefficient as a firstly updated first correlation coefficient, on the basis of the eighth correlation coefficient and on the basis of the eleventh correlation coefficient;

secondly updating the firstly updated first correlation coefficient as a secondly updated first correlation coefficient on the basis of the updated seventh correlation coefficient and on the basis of the updated ninth correlation coefficient, to remove the effect due to a simultaneous call by the processing types that are executed between tiers on the corrected first correlation coefficient;

specifying, based on the secondly updated first correlation coefficient and other updated correlation coefficients for other processing types, a pair of processing types that have a significant correlation with each other as being in a call relationship, and registering the pair of processing types in a call relationship table in the storing unit;

acquiring time series data indicating a response time of the processing types that are executed between tiers from the system; and specifying, when the acquired time series data on the first processing type indicates a response delay occurring in the first processing type, from pairs of processing types registered in the call relationship table a processing type that is in the call relationship with the first processing type, determining whether a response delay occurs in the processing type, and outputting a determination result wherein the determination result indicates that the response delay is propagated from the processing type to the first processing type when the processing type is executed in a tier lower than a tier in which the first processing type is executed, and the acquired time series data on the processing type indicates a response delay occurring in the processing type in a same time period as for the first processing type.

6. The correlation coefficient calculation device according to claim 5, wherein the specifying the third processing type specifies, from among a plurality of third processing types, the third processing type that has a significant correlation with the second processing type and specifies, from among a plurality of fourth processing types, the fourth processing type that has a significant correlation with the first processing type.

* * * * *